US010891540B2

(12) United States Patent
Draelos et al.

(10) Patent No.: US 10,891,540 B2
(45) Date of Patent: Jan. 12, 2021

(54) ADAPTIVE NEURAL NETWORK MANAGEMENT SYSTEM

(71) Applicant: National Technology & Engineering Solutions of Sandia, LLC, Albuquerque, NM (US)

(72) Inventors: Timothy J. Draelos, Albuquerque, NM (US); James Bradley Aimone, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 1045 days.

(21) Appl. No.: 14/975,420

(22) Filed: Dec. 18, 2015

(65) Prior Publication Data

US 2017/0177993 A1 Jun. 22, 2017

(51) Int. Cl.
*G06N 3/04* (2006.01)
(52) U.S. Cl.
CPC .................. *G06N 3/0454* (2013.01)
(58) Field of Classification Search
CPC .................................................... G06N 3/082
See application file for complete search history.

(56) References Cited

U.S. PATENT DOCUMENTS

| 8,630,966 B2 | 1/2014 | Gage et al. | |
|---|---|---|---|
| 2016/0155049 A1* | 6/2016 | Choi | G06N 3/082 |
| | | | 706/16 |

OTHER PUBLICATIONS

Zhou et al., Online Incremental Feature Learning with Denoising Autoencoders, in Proc. of the 15th International Conference on AISTATS (2012) at 1453-1461 (Year: 2012).*
Rasmus et al., Denoising autoencoder with modulated lateral connections learns invariant representations of natural images, Presentation at ICLR 2015 workshop, retrieved from Internet <https://arxiv.org/abs/1412.7210> (Year: 2015).*
Calandra et al., Learning Deep Belief Networks from Non-Stationary Streams, Artificial Neural Networks and Machine Learning (ICANN), vol. 7553 (2012) at pp. 379-386 (Year: 2006).*
Bengio et al., Greedy Layer-Wise Training of Deep Networks, Proc of the 19th International Conference on Neural Information Processing Systems (2006) at pp. 153-160 (Year: 2006).*
Larochelle, et al., Exploring Strategies for Training Deep Neural Networks, Journal of Machine Learning Research (2009) at pp. 1-40 (Year: 2009).*

(Continued)

*Primary Examiner* — Vincent Gonzales
(74) *Attorney, Agent, or Firm* — Yee & Associates, P.C.

(57) ABSTRACT

A method and computer system for managing a neural network. Data is sent into an input layer in a portion of layers of nodes in the neural network. The data moves on an encode path through the portion such that an output layer in the portion outputs encoded data. The encoded data is sent into the output layer on a decode path through the portion back to the input layer to obtain a reconstruction of the data by the input layer. A determination is made as to whether an undesired amount of error has occurred in the output layer based on the data sent into the input layer and the reconstruction of the data. A number of new nodes is added to the output layer when a determination is present that the undesired amount of the error occurred, enabling reducing the error using the number of the new nodes.

24 Claims, 17 Drawing Sheets

(56) References Cited

OTHER PUBLICATIONS

Chambers et al., "Network Modeling of Adult Neurogenesis: Shifting Rates of Neuronal Turnover Optimally Gears Network Learning according to Novelty Gradient," Journal of Cognitive Neuroscience, vol. 19, No. 1, Jan. 2007, 19 pages.
Chambers et al., "Simulated Apoptosis/Neurogenesis Regulates Learning and Memory Capabilities of Adaptive Neural Networks," Neuropsychopharmacology, vol. 29, copyright 2004, pp. 747-758.
Crick et al., "Apoptosis, Neurogenesis, and Information Content in Hebbian Networks," Biological Cybernetics, vol. 94, No. 1, Jan. 2006, 16 pages.
Calandra et al., "Learning Deep Belief Networks from Non-Stationary Streams," Artificial Neural Networks and Machine Learning (ICANN), vol. 7553, copyright 2012, pp. 379-386.
Feng et al., "Error Minimized Extreme Learning Machine with Growth of Hidden Nodes and Incremental Learning," IEEE Transactions on Neural Networks, vol. 20, No. 8, Aug. 2009, pp. 1352-1357.
Rudy et al., "Generative Class-Conditional Denoising Autoencoders," CoRR, vol. abs/1412.7009, 3rd revision, Apr. 2015, 9 pages.
Yosinski et al., "How transferable are features in deep neural networks'?," Advances in Neural Information Processing Systems 27, copyright 2014, 14-pages.
Kandaswamy et al., "Improving Deep Neural Network Performance by Reusing Features Trained with Transductive Transference," Artificial Neural Networks and Machine Learning (ICANN), vol. 8681, copyright 2014, 8 pages.

\* cited by examiner

| DIGIT | (a) NEUROGENIC TRANSFER LEARNING (% CORRECT) | (b) FIXED NETWORK TRANSFER LEARNING (% CORRECT) | (c) FIXED NETWORK ALL DATA (% CORRECT) |
|---|---|---|---|
| 0 | 98.2 | 98.8 | 99.7 |
| 1 | 98.3 | 98.4 | 99.4 |
| 2 | 98.2 | 93.4 | 98.7 |
| 3 | 93.5 | 95.0 | 98.9 |
| 4 | 95.5 | 95.5 | 98.3 |
| 5 | 94.2 | 92.4 | 97.9 |
| 6 | 96.7 | 97.2 | 98.9 |
| 7 | 94.2 | 92.7 | 98.4 |
| 8 | 95.3 | 93.4 | 98.4 |
| 9 | 94.1 | 93.8 | 98.4 |
| ALL | 95.5 | 95.1 | 98.7 |

FIG. 16

ADAPTIVE NEURAL NETWORK MANAGEMENT SYSTEM

GOVERNMENT LICENSE RIGHTS

This invention was made with United States Government support under Contract No. DE-AC04-94AL85000 between Sandia Corporation and the United States Department of Energy. The United States Government has certain rights in this invention.

BACKGROUND INFORMATION

1. Field

The present disclosure relates generally to an improved computer system and, in particular, to a method and apparatus for a neural network in a computer system. Still more particularly, the present disclosure relates to a method and apparatus for managing a neural network in a computer system.

2. Background

Neural networks on computer systems are programs that are inspired by the behavior of biological neural networks. Neural networks on computer systems are also referred to as artificial neural networks. Neural networks are considered nonlinear statistical data modeling tools in which complex relationships between inputs and outputs are modeled or patterns are found.

Neural networks may be used to solve problems in a number of different types of areas. For example, neural networks are used for handwriting recognition, object recognition, voice recognition, facial recognition, language translation, character recognition, stock market timing, and other uses.

Neural networks are initially trained to learn about relationships between data. Training neural networks is an expensive and time-consuming process.

One type of neural network is a deep neural network. A deep neural network is an artificial neural network with multiple hidden layers of nodes between the input layer and the output layer. The training of this type of neural network is computationally intensive. For example, the training of a neural network may involve a week, a month, or more time from a supercomputer.

This training process may be impractical for smaller businesses that do not have supercomputers. A smaller business may purchase time on a supercomputer to perform training of a neural network. This proposition, however, is expensive.

Whether such an investment should be made depends on how long the neural network will be useful after training. Data processed by a neural network may change such that the neural network no longer performs with a desired level of accuracy.

This drift in data may be problematic depending on how much drift in data may occur over time. For example, training a neural network on handwriting recognition may be worthwhile because new characters do not appear in handwriting.

On the other hand, a neural network that is trained to recognize objects in images may not be as useful over time. For example, a neural network trained to recognize automobiles today may not be as accurate after a period of time such as 10 or 20 years. The models and designs of automobiles change over time.

At some point, the change may be such that the neural network is unable to provide an accurate identification of an automobile in an image. As a result, over time, the neural network is unable to process images of automobiles with a desired level of accuracy.

If data processed by a neural network changes enough that the level of accuracy drops below a desired level, performing additional training on the neural network is impractical. Instead, this situation is handled by training a new neural network from the start. The current process is undesirable taking into account the expense and time required.

Therefore, it would be desirable to have a method and apparatus that take into account at least some of the issues discussed above, as well as other possible issues. For example, it would be desirable to have a method and apparatus that overcome a technical problem with managing a neural network when changes in data that cannot be processed with a desired level accuracy by the neural network occur.

SUMMARY

An embodiment of the present disclosure provides a method for managing a neural network. Data is sent into an input layer in a portion of layers of nodes in the neural network in which the data moves on an encode path through the portion such that an output layer in the portion outputs encoded data. The encoded data is sent into the output layer on a decode path through the portion back to the input layer to obtain a reconstruction of the data by the input layer. A determination is made as to whether an undesired amount of error has occurred in the output layer based on the data sent into the input layer and the reconstruction of the data. A number of new nodes is added to the output layer when a determination is present that the undesired amount of the error has occurred, enabling reducing the error using the number of the new nodes.

Another embodiment of the present disclosure provides a computer system comprising a neural network manager that sends data into an input layer in a portion of layers of nodes in the neural network in which the data moves on an encode path through the portion such that an output layer in the portion outputs encoded data. The neural network manager also sends the encoded data into the output layer on a decode path through the portion back to the input layer to obtain a reconstruction of the data by the input layer. Further, the neural network manager determines whether an undesired amount of error has occurred in the output layer during based on the data sent into the input layer and the reconstruction of the data. Still further, the neural network manager adds a number of new nodes to the output layer when a determination is present that the undesired amount of error has occurred, enabling reducing the error using the number of the new nodes.

Yet another embodiment of the present disclosure provides a computer program product for managing a neural network. The computer program product comprises a computer readable storage media, and a first program code, second program code, third program code, and fourth program code stored on the computer readable storage media. The first program code sends data into an input layer in a portion of layers of nodes in the neural network in which the data moves on an encode path through the portion such that an output layer in the portion outputs encoded data. The second program code sends the encoded data into the output layer on a decode path through the portion back to the input layer to obtain a reconstruction of the data by the input layer. The third program code determines whether an undesired amount of error has occurred in the output layer during based on the data sent into the input layer and the reconstruction of the data. The fourth program code adds a number of new nodes to the output layer when a determination is present that the undesired amount of the error has occurred, enabling reducing the error using the number of the new nodes.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 16 is an illustration of a table comparing performance and classifying data in accordance with an illustrative embodiment;

DETAILED DESCRIPTION

Figure 1:
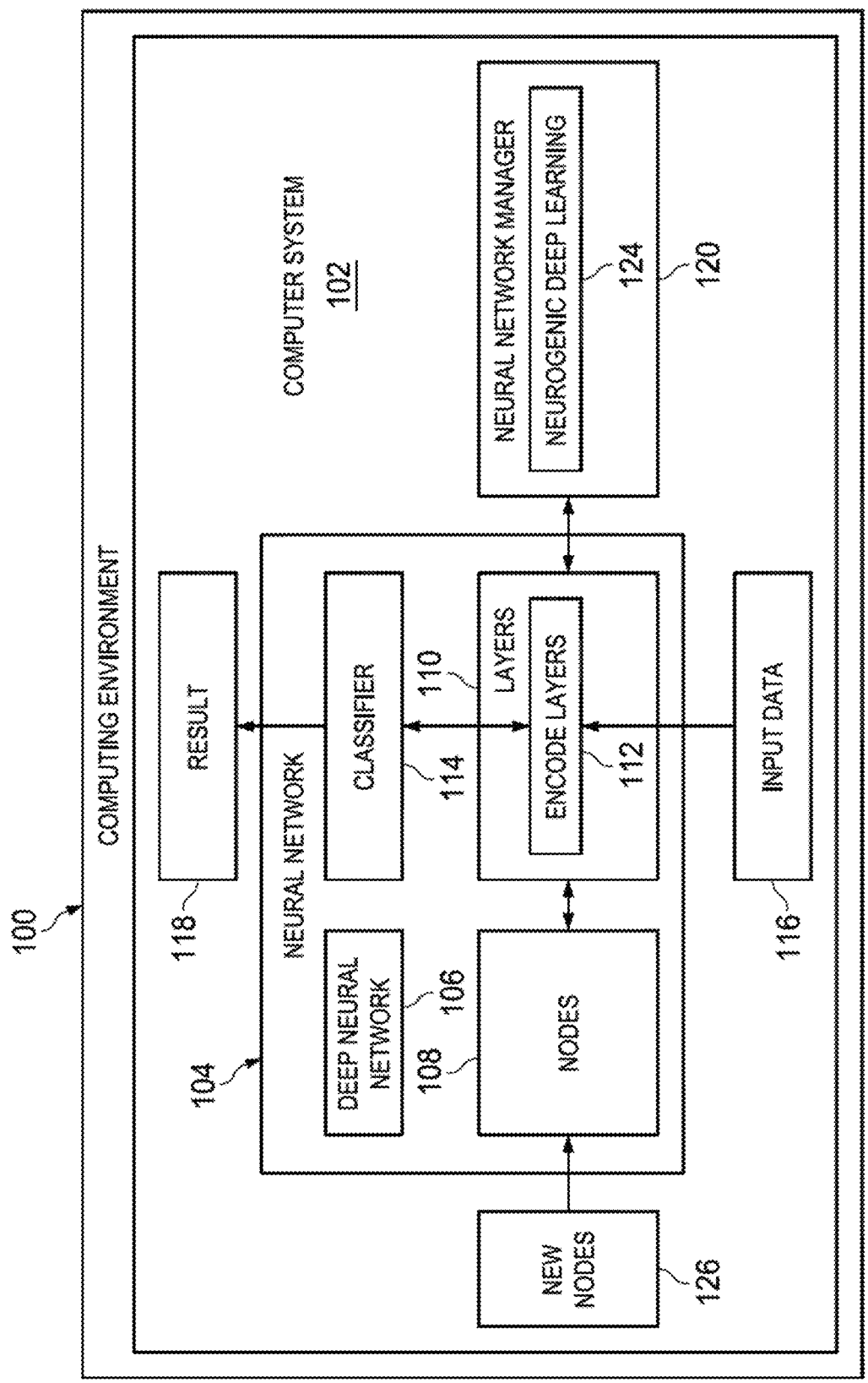
FIG. 1 is an illustration of a block diagram of a computing environment in accordance with an illustrative embodiment.

The illustrative embodiments recognize and take into account one or more different considerations. For example, the illustrative embodiments recognize and take into account that the current process of training a neural network from the beginning when the data has changed in such a manner that the neural network does not provide the desired results is time-consuming and expensive.

The illustrative embodiments recognize and take into account that neurogenic deep learning may be used to make a neural network more adaptive to new data. For example, nodes may be added to layers in which the nodes may be trained to process the new data while maintaining the stability of the network.

The illustrative embodiments also recognize and take into account that autoencoders are sometimes used in deep learning with neural networks. The illustrative embodiments recognize and take into account that these autoencoders may be used to identify where undesired amounts of errors may occur in a neural network instead of being used to train layers of nodes in the neural network.

The illustrative embodiments recognize and take into account that an autoencoder is a process that is currently used for unsupervised training of a layer in a neural network in which data may be sent in an encode path and a decode path through the layer. Multiple autoencoders may be used to train multiple layers in the neural network.

The illustrative embodiments recognize and take into account that when new nodes are added, statistics from the encodings of previously used data for training may be available. The statistics may be used to generate data that was previously used to train the neural network. This data is replay data, and may be referred to as intrinsic replay data. As a result, the replay data generated from the statistics for replay may be used when training the neural network with the new nodes to stabilize past training of the neural network in the other nodes.

Thus, the illustrative embodiments provide a method and apparatus for managing a neural network. In one illustrative example, data is sent into an input layer in a portion of layers of nodes in the neural network in which the data moves on an encode path through the portion such that an output layer in the portion outputs encoded data. The encoded data is sent into the output layer on a decode path through the portion back to the input layer to obtain a reconstruction of the data by the input layer. A determination is made as to whether an undesired amount of error has occurred in the output layer based on the data sent into the input layer and the reconstruction of the data.

A number of new nodes are added to the output layer when a determination is present that an undesired amount of the error has occurred, enabling reducing the error using the number of the new nodes. As used herein, a "number of,"

when used with reference to items, means one or more items. For example, a "number of new nodes" means one or more new nodes. These new nodes may be trained enabling reducing the error using the number of new nodes.

With reference now to the figures and, in particular, with reference to FIG. 1, an illustration of a block diagram of a computing environment is depicted in accordance with an illustrative embodiment. As depicted, computing environment 100 includes computer system 102. Computer system 102 is a hardware system and includes one or more data processing systems. When more than one data processing system is present, those data processing systems may be in communication with each other using a communications medium. The communications medium may be a network. The data processing systems may be selected from at least one of a computer, a server computer, a tablet, or some other suitable data processing system.

As used herein, the phrase "at least one of," when used with a list of items, means different combinations of one or more of the listed items may be used and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

In this illustrative example, neural network 104 runs on computer system 102. Neural network 104 is an artificial neural network. Neural network 104 may take various forms. In this particular example, neural network 104 is deep neural network 106.

As depicted, neural network 104 includes nodes 108. Nodes 108 are organized into layers 110. Layers 110 are connected to each other in neural network 104.

As depicted, layers 110 include encode layers 112. Additionally, neural network 104 also may include classifier 114 that places data into classes. Encode layers 112 receive and process input data 116. Classifier 114 generates result 118 from input data 116 processed by layers 110. For example, classifier 114 may identify characters, numbers, symbols, objects, or other types of information.

A node in nodes 108 is a building block for neural network 104. The node has a number of inputs and generates an output. The output may be connected to one or more other nodes in nodes 108. The number of inputs is processed using a function that results in the output for the node.

In the illustrative example, when input data 116 changes, result 118 may include an undesired amount of error. For example, neural network 104 may have been trained to recognize birds in North America. If input data 116 includes data about birds in South America, neural network 104 may not generate result 118 that correctly identifies birds with a desired level of accuracy. As a result, an undesired amount of error is present.

In the illustrative example, neural network 104 is managed by neural network manager 120. Neural network manager 120 may operate to manage neural network 104 during the normal operational state of neural network 104. The operational state is the state of neural network 104 after training when neural network 104 is used for its intended purpose. In this manner, neural network manager 120 operates as an adaptive neural network management system.

For example, neural network manager 120 may reduce errors in result 118 using neurogenic deep learning 124 on neural network 104. As depicted, neurogenic deep learning 124 includes adding new nodes 126 to layers 110 of nodes 108.

Neural network manager 120 may be implemented in software, hardware, firmware, or a combination thereof. When software is used, the operations performed by neural network manager 120 may be implemented in program code configured to run on hardware, such as a processor unit. When firmware is used, the operations performed by neural network manager 120 may be implemented in program code and data and stored in persistent memory to run on a processor unit. When hardware is employed, the hardware may include circuits that operate to perform the operations in neural network manager 120.

In the illustrative examples, the hardware may take the form of a circuit system, an integrated circuit, an application-specific integrated circuit (ASIC), a programmable logic device, a neuromorphic computing system, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

Figure 2:
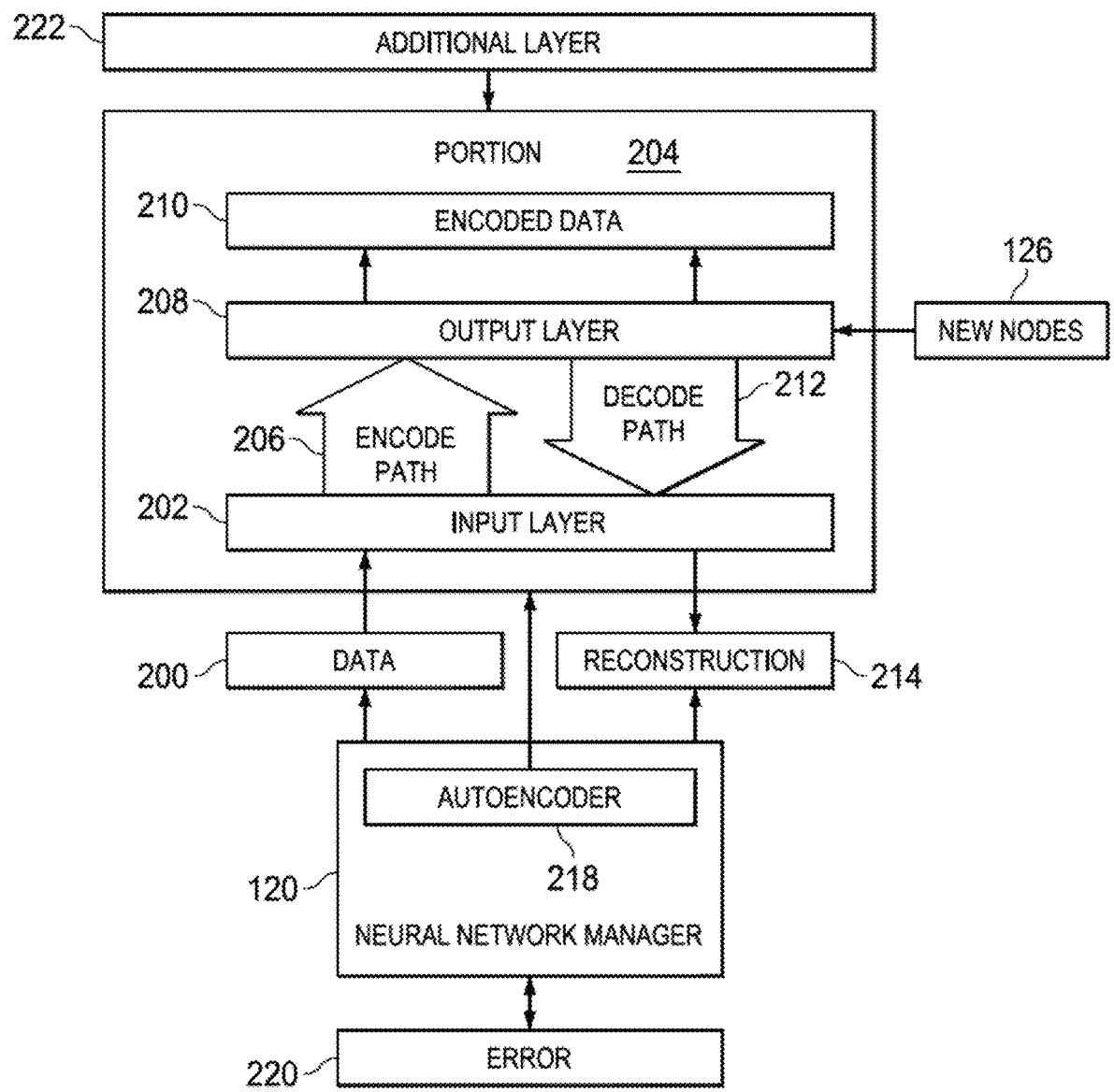
FIG. 2 is an illustration of a process for managing errors in a neural network in accordance with an illustrative embodiment.

With reference next to FIG. 2, an illustration of a process for managing errors in a neural network is depicted in accordance with an illustrative embodiment. In the illustrative examples, the same reference numeral may be used in more than one figure. This reuse of a reference numeral in different figures represents the same element in the different figures.

In this particular example, neural network manager 120 sends data 200 into input layer 202 in portion 204 of layers 110 of nodes 108 in neural network 104. Data 200 moves on encode path 206 through portion 204 such that output layer 208 in portion 204 outputs encoded data 210. Neural network manager 120 send encoded data 210 into output layer 208 on decode path 212 through portion 204 back to input layer 202 to obtain reconstruction 214 of data 200 by input layer 202.

In this illustrative example, autoencoder 218 is used to have portion 204 of neural network 104 reconstruct data 200. In other words, the routing of data 200 through portion 204 may be controlled using a process such as autoencoder 218.

In this illustrative example, autoencoder 218 is not used for training and updating weights of nodes 108 in layers 110 in portion 204. Instead, autoencoder 218 is used to generate reconstruction 214 that is compared to data 200 to determine whether an undesired amount of error 220 is present in portion 204 of layers 110 of nodes 108 in neural network 104. In other words, the routing mechanism in autoencoder 218 is used to send data through portion 204 of neural network 104 in the encoding direction on encode path 206 and the decoding direction on decode path 212.

Neural network manager 120 determines whether an undesired amount of error 220 has occurred in output layer 208 based on data 200 sent into input layer 202 and reconstruction 214 of data 200 output by input layer 202. In this illustrative example, an undesired amount of error 220 occurs when reconstruction 214 varies from data 200 more than a threshold. In other words, neural network manager 120 determines whether a difference between data 200 and reconstruction 214 of data 200 is greater than a threshold for when an undesired amount of error 220 is considered to be present. The threshold may be selected based on when the difference between data 200 and reconstruction 214 is acceptable.

As depicted, neural network manager 120 adds number of new nodes 126 to output layer 208 when a determination is made that the undesired amount of error 220 has occurred. Neural network manager 120 enables reducing error 220 in the future using a number of new nodes 126.

Additionally, neural network manager 120 trains neural network 104 with the number of new nodes 126 in output layer 208. In particular, neural network manager 120 trains the number of new nodes 126.

When an undesired amount of error 220 is absent in all the layers in portion 204, neural network manager 120 may add additional layer 222 from layers 110 to portion 204 in a location subsequent to the output layer 208 in portion 204. In this illustrative example, additional layer 222 becomes output layer 208.

Thereafter, data 200 is sent on encode path 206 to additional layer 222, which is now output layer 208. Encoded data 210 is sent on decode path 212 from output layer 208 to input layer 202 to obtain reconstruction 214 of data 200. Another comparison of data 200 and reconstruction 214 is made to determine whether an undesired amount of error 220 is present.

If an undesired amount of error 220 is not present, yet another layer may be added to portion 204 from layers 110. In this manner, layers 110 may be progressively tested to determine whether any of layers 110 causes an undesired amount of error 220 in reconstruction 214.

Figure 3:
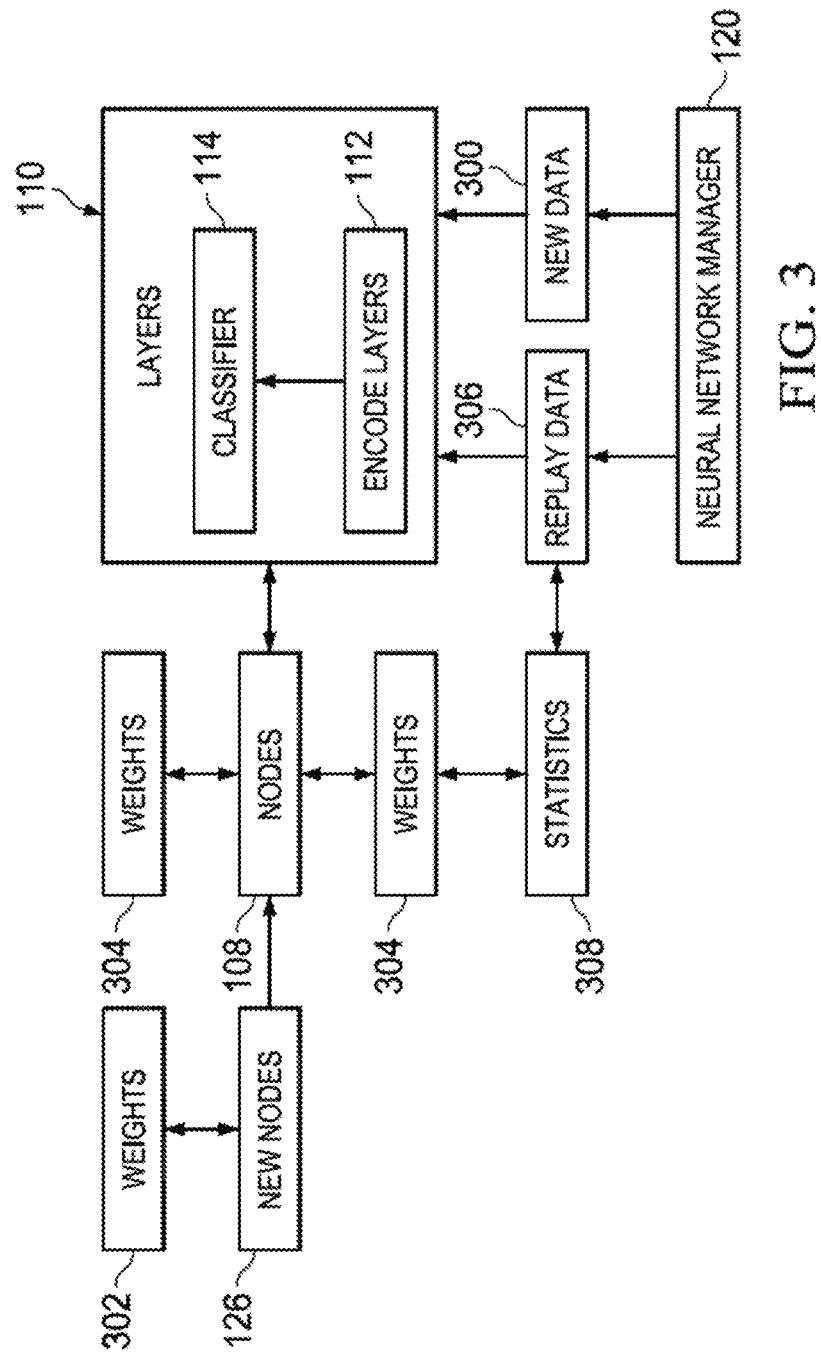
FIG. 3 is an illustration of a block diagram for training in a neural network in accordance with an illustrative embodiment.

Turning now to FIG. 3, an illustration of a block diagram for training in a neural network is depicted in accordance with an illustrative embodiment. In this illustrative example, neural network manager 120 performs training of neural network 104 with the number of new nodes 126 added to neural network 104.

As depicted, neural network manager 120 may train the number of new nodes 126 using new data 300. New data 300 is data that neural network 104 is unable to process with a desired level of accuracy. The number of new nodes 126 have been added and are trained to process new data 300 such that neural network 104 generates result 118 with a desired level of accuracy.

In this illustrative example, the number of new nodes 126 has weights 302. Weights 302 may be selected such that weights 302 adjust more quickly than weights 304 for nodes 108 that are present in neural network 104.

In addition, neural network manager 120 may create replay data 306 using statistics 308 about the encoding of data by neural network 104. Statistics 308 may be obtained when neural network 104 is originally trained. Samples for replay data 306 may be created from the statistics. When neural network 104 was trained, samples of data were sent through neural network 104. Each of the samples resulted in an encoding. Statistics 308 may include, for example, a mean and covariance for the encodings. Alternatively, in another illustrative example, statistics 308 may be obtained from weights 304 in neural network 104.

As depicted, neural network manager 120 sends both replay data 306 and new data 300 on encode path 206 in this example. In this depicted example, new data 300 is used to train the number of new nodes 126. Replay data 306 is used to reinforce what neural network 104 has already learned. In other words, replay data 306 may be used to maintain the stability of nodes 108 in neural network 104 when training of the number of new nodes 126 occurs.

In one illustrative example, one or more technical solutions are present that overcome a technical problem with managing a neural network when changes in data that cannot be processed with a desired level of accuracy by the neural network occur. As a result, one or more technical solutions may provide a technical effect of increasing the accuracy of results generated by a neural network without retraining the entire neural network from the beginning. Additionally, the technical effect of increasing the time over which a neural network is useful for performing a particular application is also present from using one or more of the technical solutions.

Further, another technical effect is that the one or more technical solutions make it feasible to train neural networks using neurogenic deep learning even when the data may change over time. The adaptability in learning new data avoids making a neural network obsolete and having to train a new neural network when data changes.

As a result, computer system 102 operates as a special purpose computer system in which neural network manager 120 in computer system 102 enables managing neural network 104. For example, neural network manager 120 enables performing neurogenic deep learning 124 when result 118 is not as accurate as desired. For example, neural network manager 120 may add new nodes 126 to one or more of layers 110 in neural network 104. In particular, neural network manager 120 transforms computer system 102 into a special purpose computer system as compared to currently available general computer systems that do not have neural network manager 120.

The illustration of computing environment 100 and the different components in computing environment 100 in FIGS. 1-3 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, in FIG. 2, portion 204 of layers 110 is a single layer and input layer 202 is output layer 208. In this particular example, another layer in layers 110 of nodes 108 is selected as the single layer when an undesired amount of error 220 is absent. Data 200 is sent into the single layer on the encode path such that the single layer outputs encoded data 210. Encoded data 210 is sent into the single layer on decode path 212. A determination is made as to whether an undesired amount of error 220 has occurred in the single layer based on data 200 sent into the input layer and reconstruction 214 of data 200 by the single layer.

As another example, other processes other than autoencoder 218 may be used. For example, restricted Boltzman Machines, Boltzman Machines, and other suitable techniques may be used in place of or in addition to autoencoder 218 in FIG. 2. Further, other large or deep neural networks may be improved in a similar fashion using an illustrative embodiment. Other neural networks that may be used for neural network 104 include, for example, deep convolutional networks, deep recurrent networks, deep belief networks, deep spiking neural networks, and other suitable neural networks.

Figure 4:
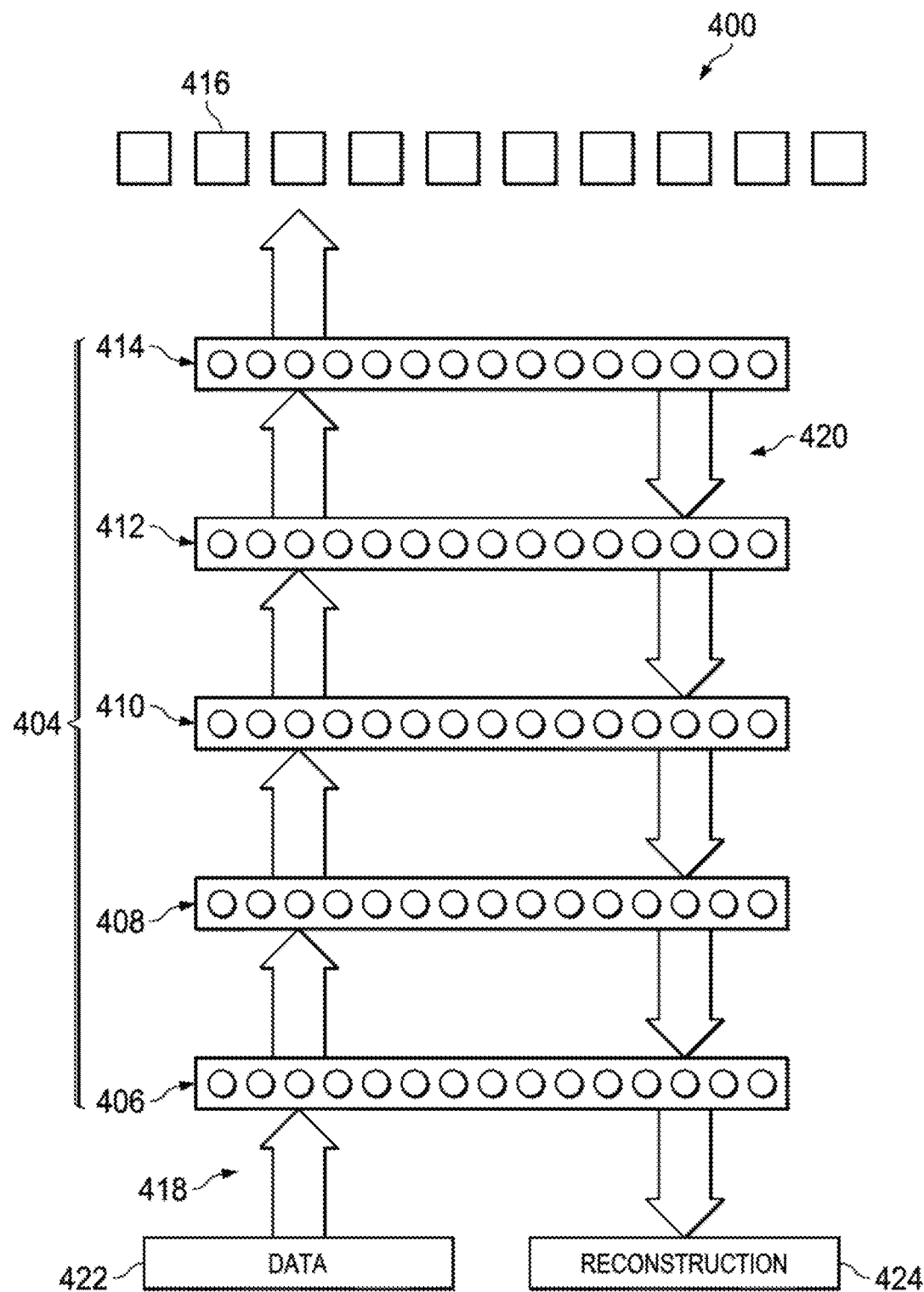
FIG. 4 is an illustration of a neural network in accordance with an illustrative embodiment.

With reference next to FIGS. 4-8, illustrations of neurogenic deep learning used to manage a neural network are depicted in accordance with an illustrative embodiment. With reference first to FIG. 4, an illustration of a neural network is depicted in accordance with an illustrative embodiment. In this illustrative example, neural network 400 is an example of an implementation for neural network 104 shown in block form in FIG. 1.

As depicted, neural network 400 has been trained using deep learning algorithms currently used to train neural networks. In this illustrative example, unlabeled data is used to pre-train neural network 400 to allow deep network performance with minimal label data.

This type of network, however, may not perform as well as desired when the data changes. In other words, transfer learning and drift may not be handled as well as desired by neural network 400 in this example. As depicted, neural network 400 is a deep neural network.

As depicted, neural network 400 includes layers 404. Each of layers 404 is formed by nodes. As depicted, layers 404 are encode layers and include layer 406, layer 408, layer 410, layer 412, and layer 414. Classifier 416 processes encoded data from layers 404 and places the encoded data into classes. These classes may be, for example, characters, numbers, objects, or other items that may be placed into different classes.

In this illustrative example, encode path 418 and the decode path 420 are present in layers 404. When classifier 416 is used with layers 404, encode path 418 may be referred to as a classification path and decode path 420 may be referred to as a reconstruction path.

In this illustrative example, the flow of data through encode path 418 and decode path 420 is controlled by neural network manager 120 in FIG. 1. Interfaces are present in layers 404 that allow neural network manager 120 to send data into any of layers 404 along encode path 418 and obtain decoding data from the corresponding layers in layers 404 on decode path 420.

For example, the original training of neural network 400 was performed using autoencoders that performed training using encode path 418 and decode path 420. These autoencoders take the form of stacked autoencoders and may be used by a neural network manager to manage how data flows on encode path 418 and decode path 420 in neural network 400.

In this illustrative example, data 422 is input into the first layer, layer 406, in neural network 400. If data 422 is encoded sufficiently, neural network 400 may continue to be used without changes. Whether data 422 is encoded with a desired level of accuracy may be determined by whether classifier 416 classifies data 422 correctly. If data 422 is not classified with a desired level accuracy by classifier 416 from data 422 encoded by layers 404, layers 404 may be progressively tested to identify where a failure to encode data 422 for a desired manner has occurred in neural network 400.

In the illustrative example, neural network manager 120 selects a portion of layers 404 for testing. The testing includes sending in data 422 on encode path 418 and reconstructing data 422 using decode path 420 to form reconstruction 424.

Figure 5:
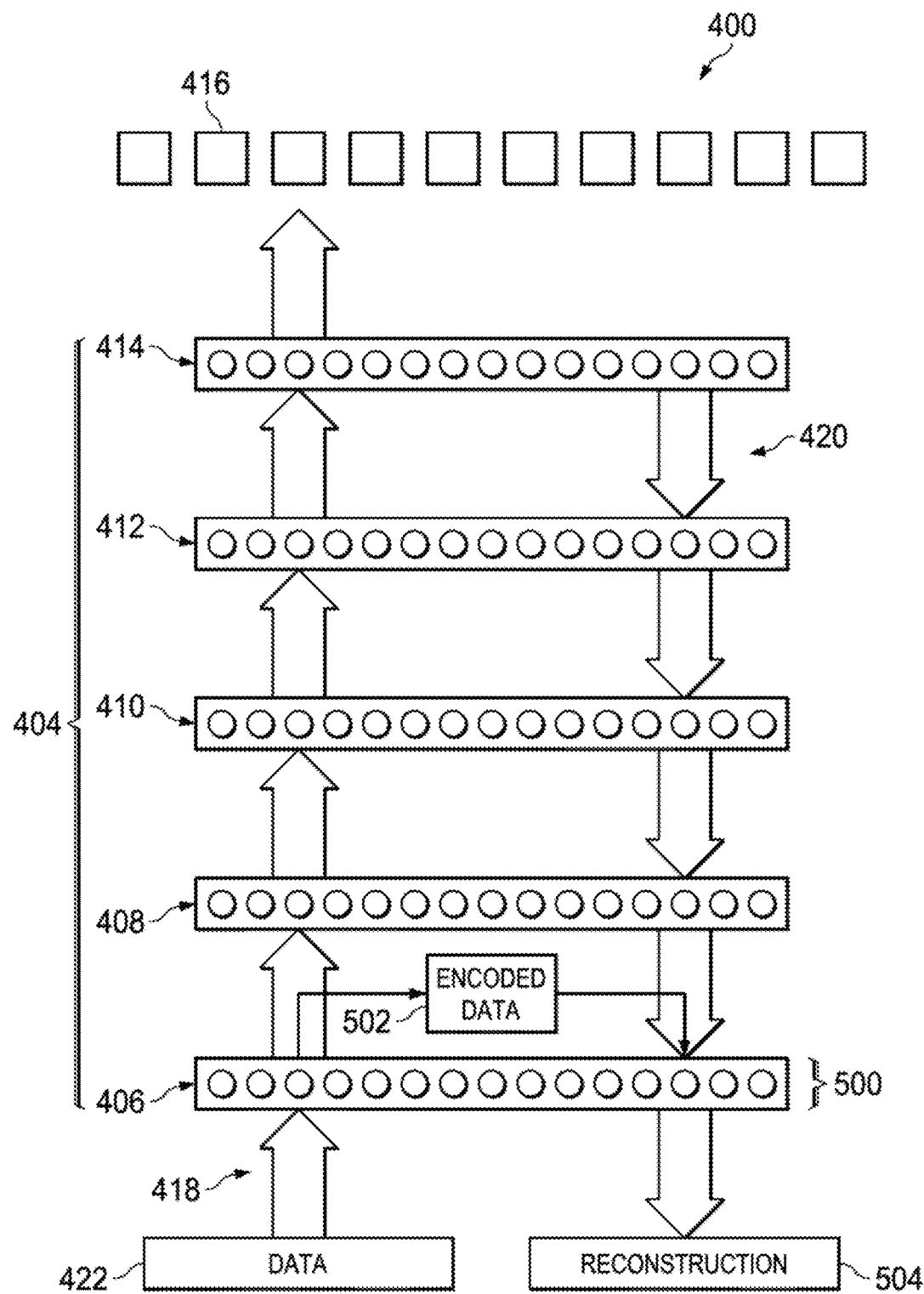
FIG. 5 is an illustration of testing the reconstruction of data in accordance with an illustrative embodiment.

Turning next to FIG. 5, an illustration of testing the reconstruction of data is depicted in accordance with an illustrative embodiment. In this figure, layer 406 has been selected as portion 500 of layers 404 to be tested.

In this illustrative example, data 422 is sent on encode path 418 through layer 406. Layer 406 outputs encoded data 502. Encoded data 502 is sent through layer 406 on decode path 420. Layer 406 outputs reconstruction 504. Reconstruction 504 is the attempt by layer 406 to re-create data 422.

Reconstruction 504 is compared to data 422. A determination is made as to whether the difference between reconstruction 504 and data 422 is within a desired threshold. If the difference is within a desired threshold, then an undesired amount of error is absent in the processing of data 422 by layer 406 to obtain reconstruction 504.

Figure 6:
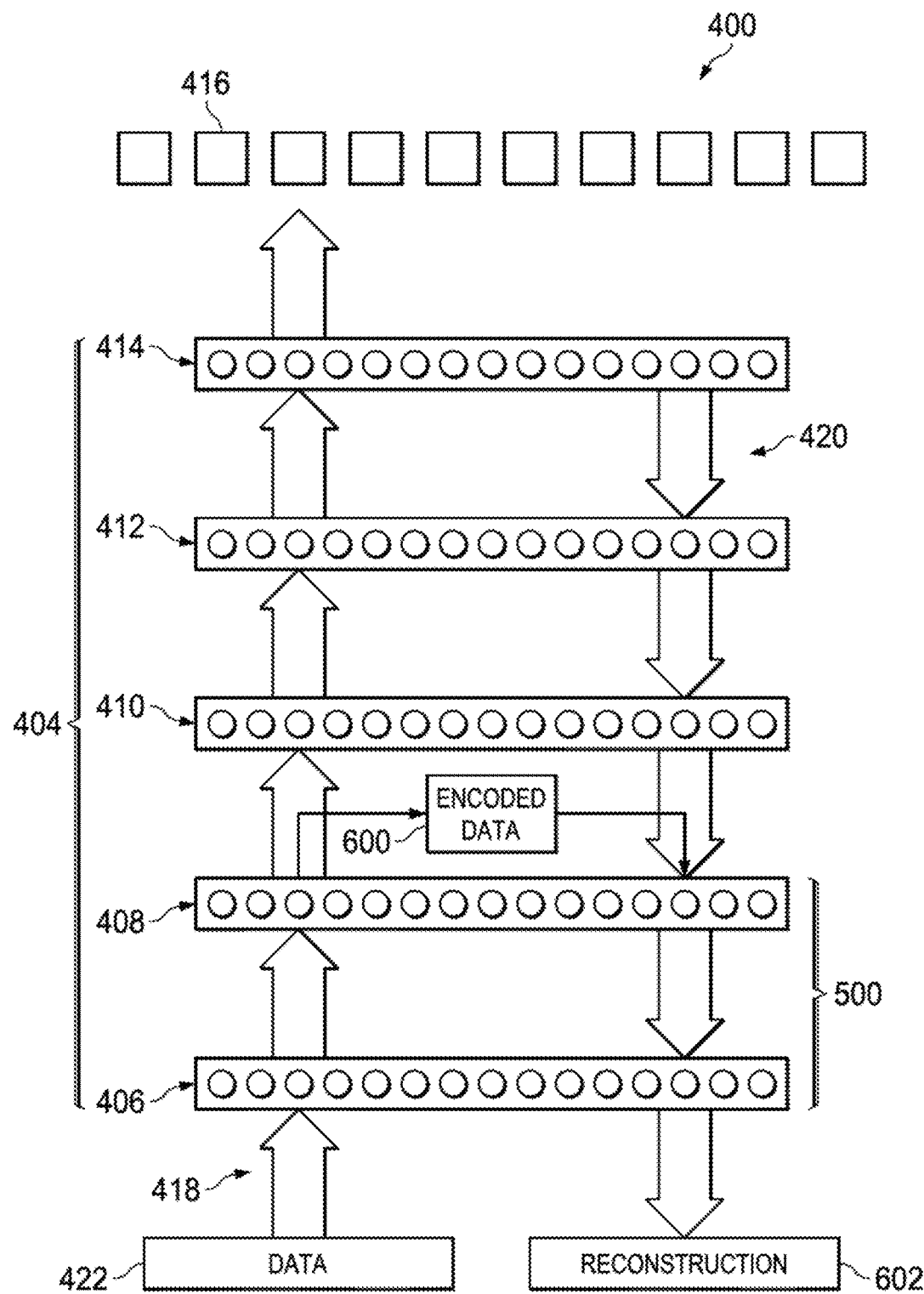
FIG. 6 is an illustration of a progression in testing the reconstruction of data in accordance with an illustrative embodiment.

With reference now to FIG. 6, an illustration of a progression in testing the reconstruction of data is depicted in accordance with an illustrative embodiment. In this example, layer 408 has been added to portion 500 of layers 404 in neural network 400 for testing. Portion 500 now includes layer 406 and layer 408.

As depicted, data 422 is sent into layer 406 on encode path 418. Encoded data 600 is obtained at the output of layer 408. Encoded data 600 is sent into layer 408 on decode path 420. Reconstruction 602 of data 422 is obtained at the output of layer 406.

A comparison of data 422 and reconstruction 602 of data 422 is performed. A determination is made as to whether the difference between data 422 and reconstruction 602 is within a desired threshold. If the difference is within the desired threshold, an undesired amount of error is absent and a progression in the testing of layers 404 continues.

Figure 7:
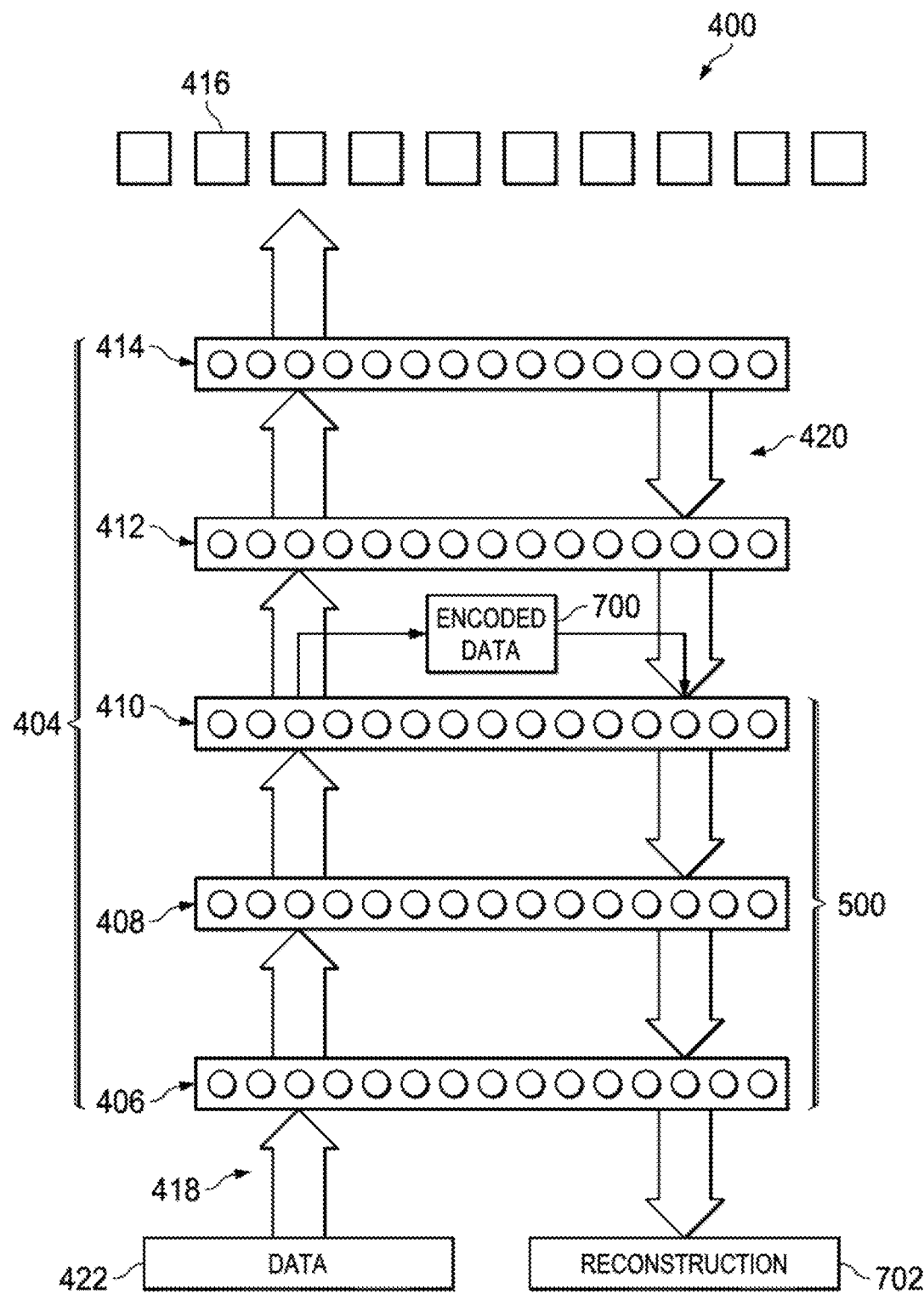
FIG. 7 is an illustration of a progression in testing the reconstruction of data in accordance with an illustrative embodiment.

Turning to FIG. 7, an illustration of a progression in testing the reconstruction of data is depicted in accordance with an illustrative embodiment. In this example, layer 410 has been added to portion 500 of layers 404 in neural network 400 for testing. As depicted, portion 500 includes layer 406, layer 408, and layer 410.

As depicted, data 422 is sent into layer 406 on encode path 418. Encoded data 700 is obtained at the output of layer 410. Encoded data 700 is sent into layer 410 on decode path 420. Reconstruction 702 of data 422 is obtained at the output of layer 406.

A comparison of data 422 and reconstruction 702 of data 422 is performed. A determination is made as to whether the difference between data 422 and reconstruction 602 is within a desired threshold. If the difference is not within the desired threshold, an undesired amount of error is present in layer 410. The undesired amounts of the errors are not present in layer 406 and layer 408 because previous testing resulted in reconstructions that did not have an undesired amount of the error.

Figure 8:
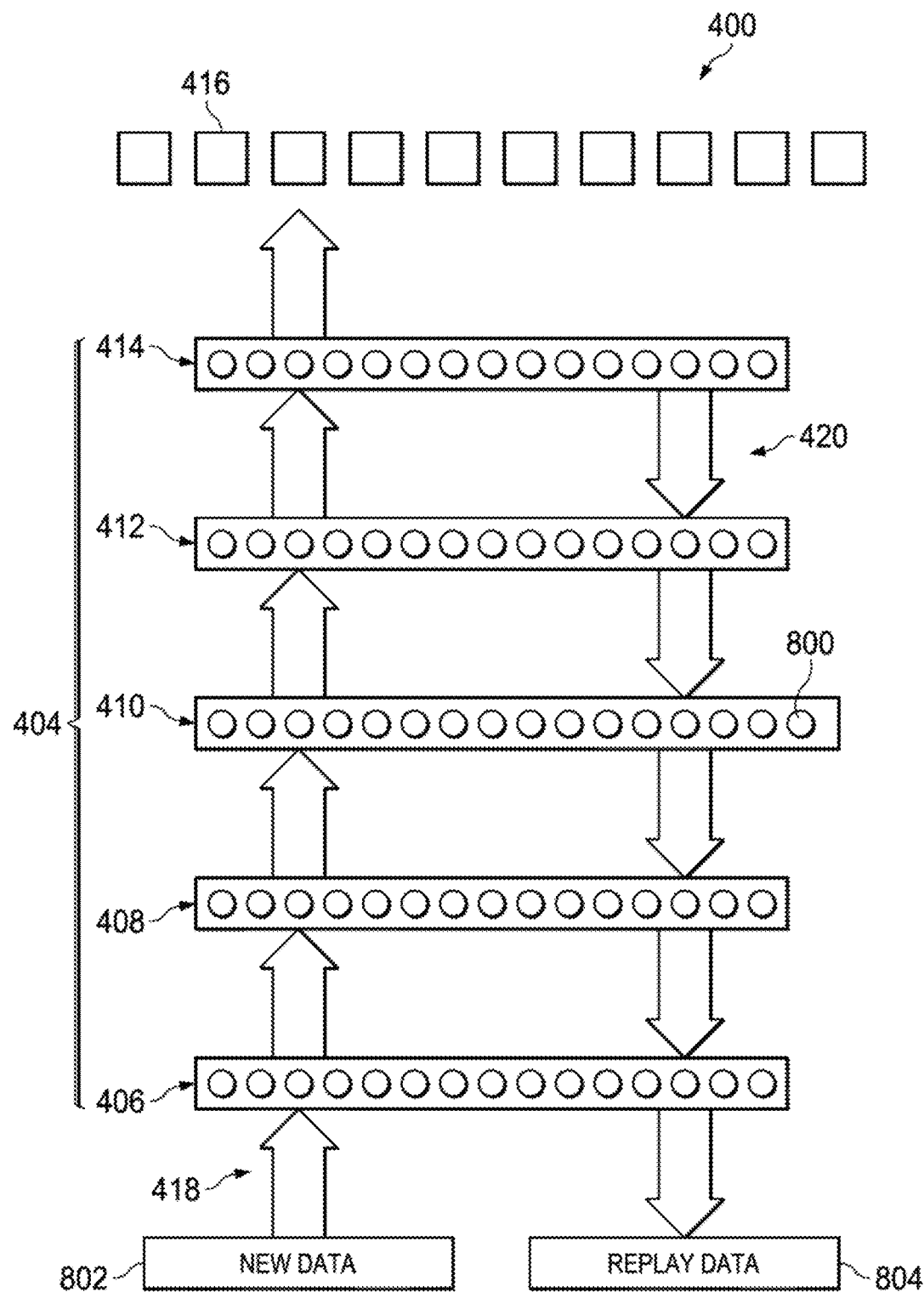
FIG. 8 is an illustration of a new node in a layer in a neural network in accordance with an illustrative embodiment.

Turning now to FIG. 8, an illustration of a new node in a layer in a neural network is depicted in accordance with an illustrative embodiment. In this illustrative example, new node 800 has been added to layer 410 as part of a neurogenic deep learning process. New node 800 is configured to be trainable.

In this illustrative example, new data 802 is sent into neural network 400 on encode path 418 to train new node 800. An autoencoder for layer 410 may be employed to train the weights for new node 800. As depicted, new data 802 is data that is desired to be encoded with a desired level of accuracy using new node 800.

Additionally, after training new node 800 with new data 802, replay data 804 may be sent with new data 802 through all of layers 404 to maintain stability in neural network 400. Replay data 804 may be created from statistics from originally training neural network 400. These statistics may be stored when originally training neural network 400. Alternatively, the statistics may be obtained from the weights for the node in neural network 400.

The illustration of neural network 400 and the process of testing, adding nodes, and training as illustrated in FIGS. 4-8 is only provided to depict one example of an implementation. The example depicted in these figures is not meant to limit the manner in which other illustrative examples may be implemented.

For example, layer 416 has been described as a classifier. Other types of layers may be used in place of the classifier in other examples. For example, a support vector machine or any other type of classifier that accepts a feature vector from the output of layers 404 on encode path 418 may be used. As another example, training of new node 800 with new data 802 may be performed at the same time that replay data 804 is used.

Figure 9:
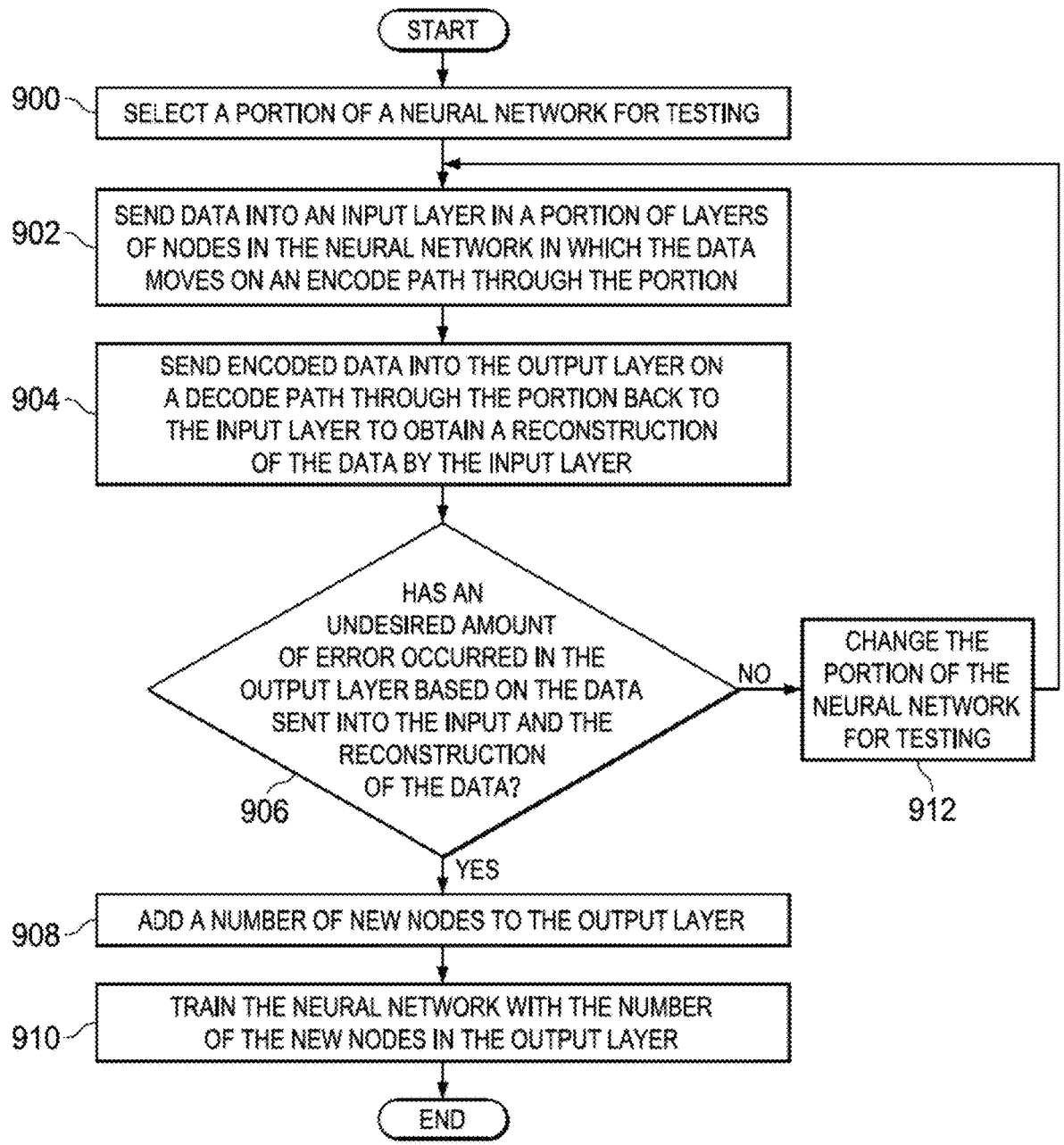
FIG. 9 is an illustration of a high-level flowchart of a process for managing a neural network in accordance with an illustrative embodiment.

With reference now to FIG. 9, an illustration of a high-level flowchart of a process for managing a neural network is depicted in accordance with an illustrative embodiment. The process illustrated FIG. 9 may be implemented in computing environment 100 in FIG. 1. For example, the process may be implemented in neural network manager 120 in FIG. 1. This process is implemented to manage a trained deep neural network, such as deep neural network 106 in FIG. 1. In this example, the neural network includes a classifier that places the data into different classifications.

The process begins by selecting a portion of the neural network for testing (step 900). This portion is a number of layers of nodes in the neural network. In other words, the portion may be one or more layers in the neural network.

The process sends data into an input layer in a portion of layers of nodes in the neural network in which the data moves on an encode path through the portion (step 902). The data is sent such that that an output layer in the portion outputs encoded data in step 902.

The process sends the encoded data into the output layer on a decode path through the portion back to the input layer to obtain a reconstruction of the data by the input layer (step 904). A determination is made as to whether an undesired amount of error occurred in the output layer based on the data sent into the input layer and the reconstruction of the data (step 906).

When a determination is present that an undesired amount of the error has occurred, the process adds a number of new nodes to the output layer (step 908). The process then trains the neural network with the number of the new nodes in the output layer (step 910) with the process terminating thereafter.

With reference again to step 906, if an undesired amount of the error is absent, the process changes the portion of the neural network for testing (step 912) and returns to step 902. In step 912, an entirely new layer may be selected as a portion or another layer may be added to the existing layers in the portion.

For example, in step 902, the process may add an additional layer from layers in the neural network to the portion for testing when the undesired amount of the error is absent. As depicted, layers may be progressively added to the portion. The additional layer is in a location subsequent to the output layer in the portion. Furthermore, the additional layer becomes the output layer. In this manner, the process in FIG. 9 enables reducing the error using the number of the new nodes.

Figure 10:
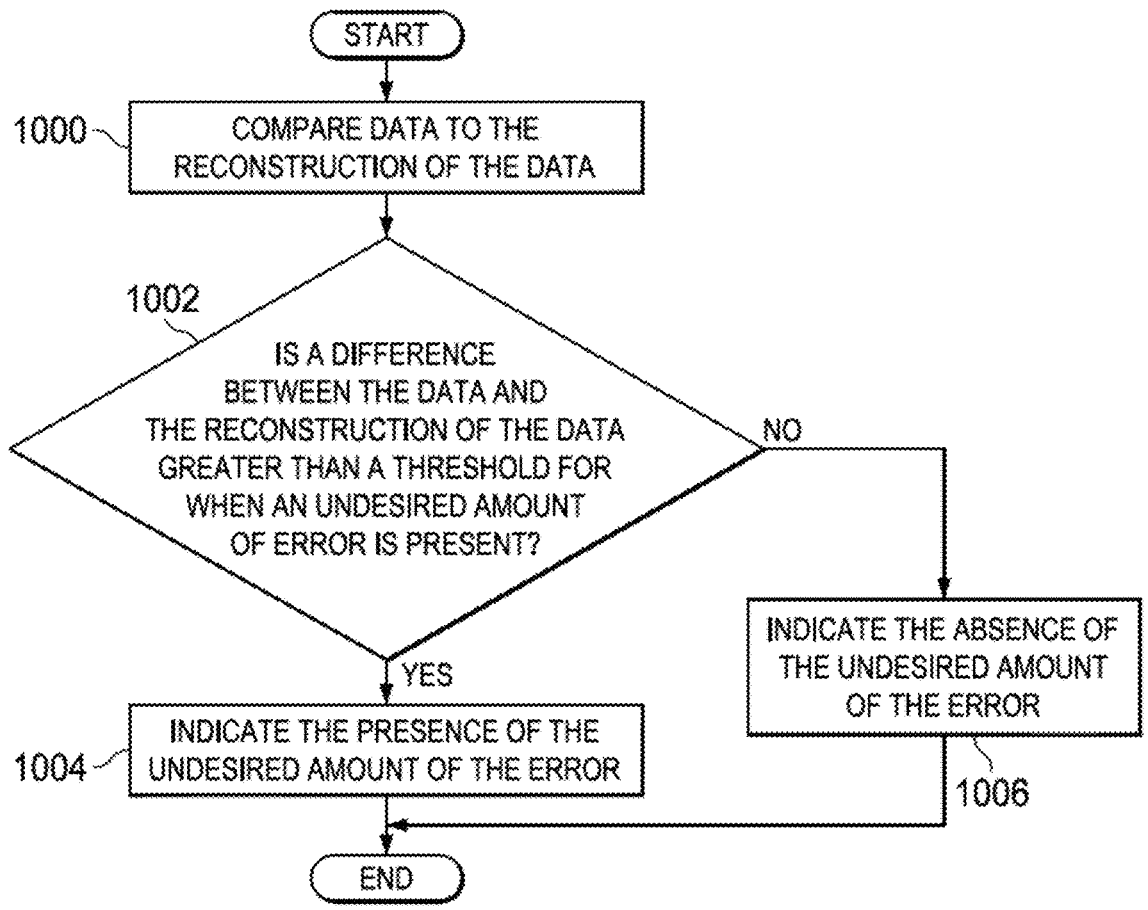
FIG. 10 is an illustration of a flowchart of a process for determining whether an undesired amount of error is present in a layer in accordance with an illustrative embodiment.

Turning next to FIG. 10, an illustration of a flowchart of a process for determining whether an undesired amount of error is present in a layer is depicted in accordance with an illustrative embodiment. The process illustrated in FIG. 10 is an example of an implementation for step 906 in FIG. 2.

The process begins by comparing the data to the reconstruction of the data (step 1000). A determination is made as to whether a difference between the data and the reconstruction of the data is greater than a threshold for when the undesired amount of error is present (step 1002).

If the difference between the data and the reconstruction of the data is greater than the threshold, the process indicates the presence of the undesired amount of the error (step 1004) with the process terminating thereafter. Otherwise, the process indicates the absence of the undesired amount of the error (step 1006) and the process terminates.

The error in FIG. 10 is a reconstruction error (RE), and can be computed at internal layers within an autoencoder in different ways. One approach involves encoding input data, I, through the selected number of encode layers and then reconstructing through the encoded input data corresponding to decode layers to the output, O, of the autoencoder to get a reconstruction of the input data. An autoencoder parameterized with weights, W, biases, b, and activation function, s, can be described from input, x, to output as N encode layers followed by N decode layers.

$$\text{Encoder: } f_{\theta_N}(f_{\theta_{N-2}}(\ldots(f_{\theta_2}(f_{\theta_1}(x)))))), \text{ where } y=f_\theta(x)=s(Wx+b) \tag{1}$$

$$\text{Decoder: } g_{\theta'_N}(g_{\theta'_{N-2}}(\ldots(g_{\theta'_2}(g_{\theta'_2}(y)))))), \text{ where } g_\theta(y)=s(W'y+b') \tag{2}$$

Then, a full reconstruction error (RE) at layer L is $$RE_{Full,L}(x)=(x-g_{\theta'_N}(\ldots(g_{\theta'_{N-L}}(f_{\theta_L}(\ldots(f_{\theta_1}(x))))))))^2. \tag{3}$$

In this example, a full reconstruction error is obtained by sending the input data through all of the layers on the encode path and then sending the result through all of the layers on the decode path. Equation 3 is the standard way of computing reconstruction for gradient descent training. In the illustrative example, a different approach is used.

When the test is performed one layer at a time, a local reconstruction error of a layer may be identified by comparing the input to that layer with its reconstruction only through its corresponding decode layer. Additionally, the L1-norm of the reconstruction error may be used to limit biasing toward outlier samples. In other words, a simple hidden layer autoencoder (SHL-AE) is used for the reconstruction error, regardless of how deep into the network a layer is.

$$RE_{Local,L}(x)=|x-g_{\theta'_{N-L}}(f_{\theta_L}(\ldots(f_{\theta_L}(x))))| \tag{4}$$

Figure 11:
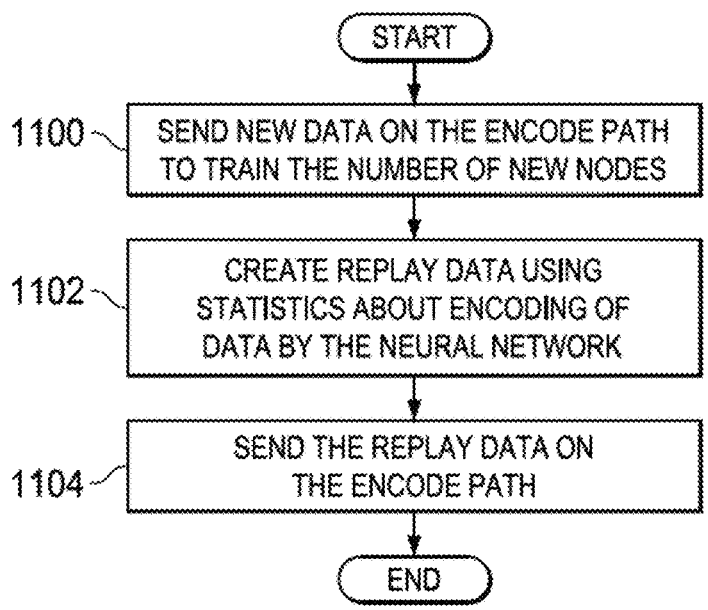
FIG. 11 is an illustration of a flowchart of a process for training in a neural network in accordance with an illustrative embodiment.

Turning to FIG. 11, an illustration of a flowchart of a process for training in a neural network is depicted in accordance with an illustrative embodiment. The process illustrated in FIG. 11 is an example of one implementation for step 910.

The process begins by sending new data on the encode path to train the number of new nodes (step 1100). This training of the new nodes may involve using an autoencoder to train the number of new nodes within the particular layer in which the number of new nodes are located.

The process creates replay data using statistics about encoding of data by the neural network (step 1102). The process sends the replay data on the encode path (step 1104)

with the process terminating thereafter. Step 1104 may also include sending the new data.

Thus, training a layer with a number of new nodes involves utilizing both new data and the replay of old data. This old data is replay data which may not be explicitly available. In some illustrative examples, training of the new nodes may be performed without the replay data.

The replay data is represented by the neural network itself in internal weights and the architecture of the neural network. Since a deep neural network learns an hierarchical feature map or a statistical distribution of the data on which neural network has been trained, examples of old data can be sampled and replayed during training in FIG. 11 to maintain stability of classes of data learned in the past.

With respect to creating replay data in step 1102, neural networks that have been trained to represent a data space can be used to produce samples from this data space using its internal structure and parameterization, such as weights, to form the replay data. Given a trained autoencoder, input data is encoded and statistics are collected of the encodings to capture a statistical representation of the data space. For each class represented in the data space, the following statistics are captured over as many samples as can be presented to the encoder.

$\mu_E$=Mean(E), where E is the encoding vector of size N $$Ch_E = \text{Cholcov}(E) \quad (5)$$

where $\text{Cholcov}^i$ is a N×M matrix via Cholesky-like covariance decomposition, where M is the number of non-singular values in the covariance matrix of E.

In this example, Cholcov is a Cholesky-like covariance decomposition function that is found in MATLAB®, a programming language developed by MathWorks, Inc. in Natick Mass. Given a class-conditional set of statistics, an encoding sample for replay data is generated using the following formula:

$$\hat{E} = \mu_E + N(0,1) * Ch_E \quad (6)$$

A random sample is drawn from an M-dimensional normal distribution with a zero mean and unit variance. Multiplying by $Ch_E$ results in an N-dimensional vector that relates to the covariance of the class encoding results. This vector is added to the class mean vector to get an encoding sample of the class. This encoding sample is decoded with the second half of the autoencoder to reconstruct a sample in the original data space.

Figure 12:
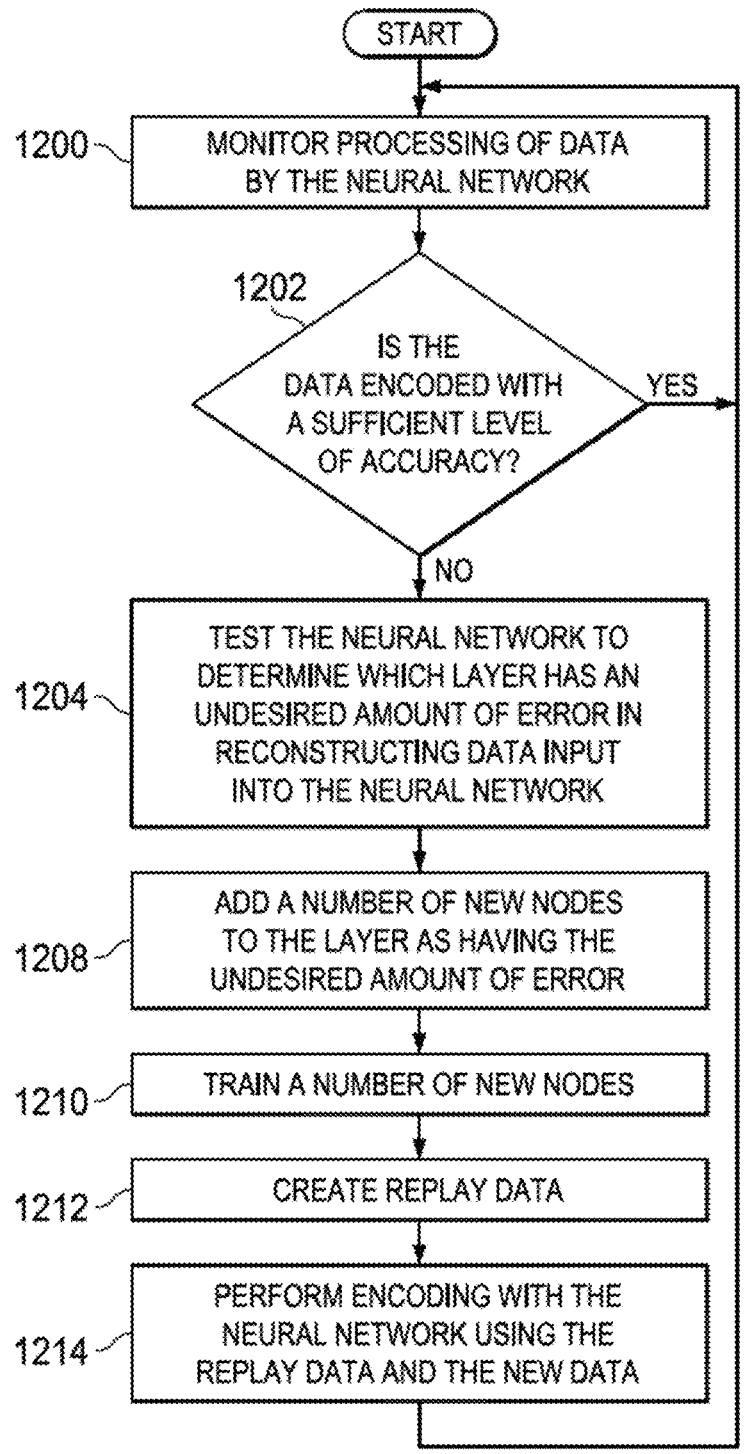
FIG. 12 is an illustration of a flowchart of a process for managing a neural network in accordance with an illustrative embodiment.

Turning next to FIG. 12, an illustration of a flowchart of a process for managing a neural network is depicted in accordance with an illustrative embodiment. The process illustrated FIG. 12 may be implemented in computing environment 100 in FIG. 1. For example, the process may be implemented in neural network manager 120 in FIG. 1. This process is implemented to manage a deep neural network that includes a classifier.

In this illustrative example, this process may be performed during the normal operation of the neural network. In other illustrative examples, the process may be run as a maintenance feature for the neural network. In other words, the neural network may stop normal operation in which data is encoded and specifically tested to determine whether undesired amounts of errors are present.

The process begins by monitoring processing of data by the neural network (step 1200). The monitoring may include monitoring the results generated by a classifier used with the neural network. In other words, results of classifications made by the classifier or errors indicated by the classifier may be monitored.

A determination is made as to whether the data is encoded with a sufficient level of accuracy (step 1202). If the classifier generates errors when the encoded data is insufficient to make a proper classification, those errors may be used in the determination in step 1202.

If errors are not generated by the classifier, classifications generated by the classifier may be compared with the input data using a separate source from the neural network. For example, if the neural network classifies images, the images may be reviewed to determine whether the classifier has generated the correct classifications.

If the classification has a sufficient level of accuracy, the process returns to step 1200. Otherwise, the process tests the neural network to determine which layer has an undesired amount of error in reconstructing data input into the neural network (step 1204). In this illustrative example, the undesired amount of the error occurs when the data input and the reconstruction of the data have a difference that is greater than a desired threshold.

A number of new nodes are added to the layer as having the undesired amount of the error (step 1208). The process then trains a number of new nodes (step 1210). The training step 1210 may occur using an autoencoder to train the number of new nodes in the layer using new data. The autoencoder is a process that was originally used to train the neural network. This process may again be used to train the new node. In this example, the new data is data that the number of new nodes should learn to encode.

Thereafter, the process creates replay data (step 1212). The process then performs encoding with the neural network using the replay data and the new data (step 1214). The process then returns to step 1200.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

For example, in FIG. 9, the portion of layers may be a single layer and the input layer is the output layer. With this example, step 906 may occur by selecting another layer in the layers of nodes as the single layer when the undesired amount of the error is absent. Step 902 then sends data into the single layer on the encode path such that the single layer outputs encoded data. Step 904 involves sending the encoded data into the single layer on the decode path and the determination in step 906 involves determining whether the undesired amount of the error occurred in the single layer based on the data sent into the input layer and the reconstruction of the data by the single layer.

To illustrate the process of neurogenic deep learning (NDL), a 6-layer autoencoder is used on a Mixed National Institute of Standards and Technology (MNIST) dataset. First, a network is trained to encode and classify a subset of MNIST. Then, nodes are added to the trained autoencoder network as needed to encode and classify each remaining digit. In a prior work, a 784-600-500-400-10 deep belief network (DBN) classifier is trained initially on digits 4, 6, and 8, and then presented with new digits for training together with samples of 4, 6, and 8 generated from the deep belief network. This size of network is shown in the paper to have overcapacity for just 3 digits by virtue of its subsequent ability to learn all 10 digits. In the example, a network of half the size is used under the assumption that neurogenic deep learning will grow a network sufficiently to learn the remaining digits when they are individually presented for training.

Figure 13:
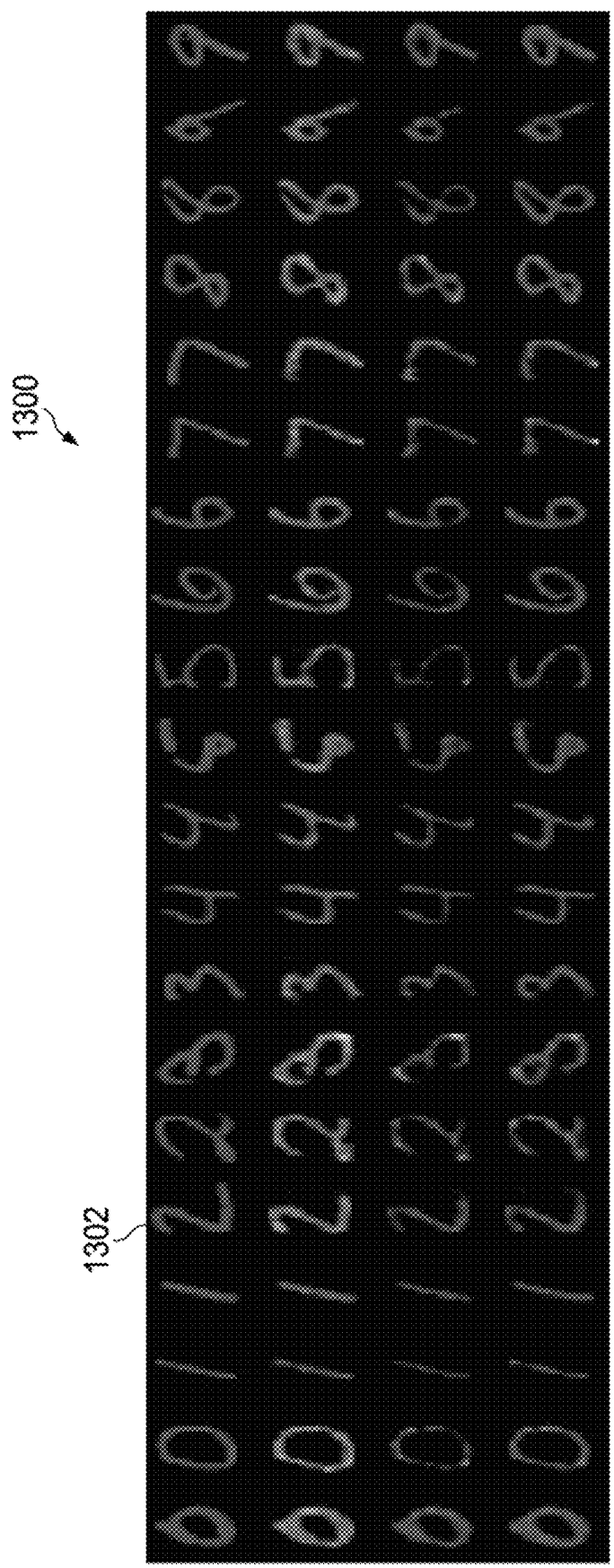
FIG. 13 is an illustration of the reconstructions of two digits for each class of numbers in accordance with an illustrative embodiment.

With reference to FIG. 13, an illustration of the reconstructions of two digits for each class of numbers is depicted in accordance with an illustrative embodiment. Image 1300 shows reconstructions 1302 that show digits 4, 6, and 8 appear to contain a universal set of digit features as seen by the quality of the reconstructions of all remaining digits as yet unseen by the neural network. Digits 1 and 7 are chosen for this example. These digits represent what may be the smallest set of features in any pair of digits.

Figure 14:
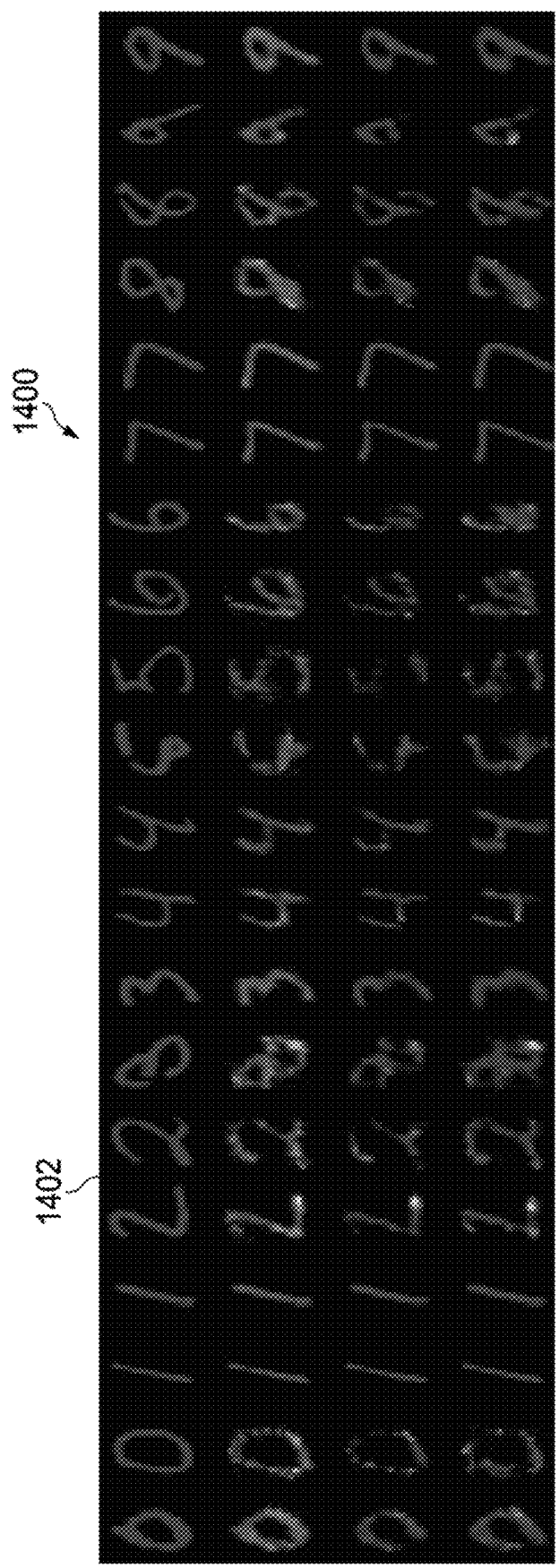
FIG. 14 is an illustration of the reconstructions of digits before training using neurogenic deep learning in accordance with an illustrative embodiment.

With reference to FIG. 14, an illustration of the reconstructions of digits before training using neurogenic deep learning is depicted in accordance with an illustrative embodiment. Image 1400 shows reconstructions 1402 that show the quality of the reconstructions of digits 1 and 7 used to train the autoencoder, and the lack of quality of the remaining reconstructions of other digits.

In this example, a 1,7-network is trained using all training samples of 1's and 7's with a 784-300-250-200-250-300-784 stacked denoising autoencoder. The activation functions used for nodes in the encode layers of the autoencoder are leaky rectified linear units.

Once autoencoder training is complete, the encoder weights are used to initialize the first three (feature) layers of a 784-300-250-200-3 classifier and the output layer is trained to classify the digits 1 and 7.

After training the classifier, the networks are ready to address concept drift through neurogenic deep learning. New classes of digits are presented in the following order: 0, 2, 4, 5, 6, 8, and 9.

Neurogenic deep learning involves presenting all samples of a new class to the autoencoder and computing the local reconstruction error of each sample using encoder weights from layer 1 and decoder weights from layer 6 in a single-hidden-layer (SHL) autoencoder. In this example, the new claims may be a Mixed National Institute of Standards and Technology digit 0.

If any samples have reconstruction errors above a user-specified threshold, then a new node is added to layer 1 and input weights for the new node are pretrained in a single-hidden-layer denoising autoencoder. In this example, only the weights for the newly added node are allowed to be updated. This step relates to the notion of plasticity in biological neurogenesis.

After training of the new node is complete, a stabilization step takes place, where the entire layer is trained in a single-hidden-layer denoising autoencoder using training samples from all classes seen by the network. The training samples are the replay data. In this example, the samples from old classes are generated via intrinsic replay.

After again calculating the reconstruction error on samples from the new class, additional nodes are added until either the reconstruction error for all samples falls below the threshold or a user-specified maximum number of new nodes is reached for the current layer. Once neurogenic deep learning is complete for the first layer, the same process repeats for each of the succeeding layers of the encoding network using outputs from the previous layer.

After neurogenic deep learning, the weights of the full autoencoder are fine-tuned. Finally, the fine-tuned encoder weights are used to populate a classifier with an additional output node so it can now classify the new class in addition to the current previous classes. The new class is 0 and the current previous classes are 1 and 7.

Figure 15:
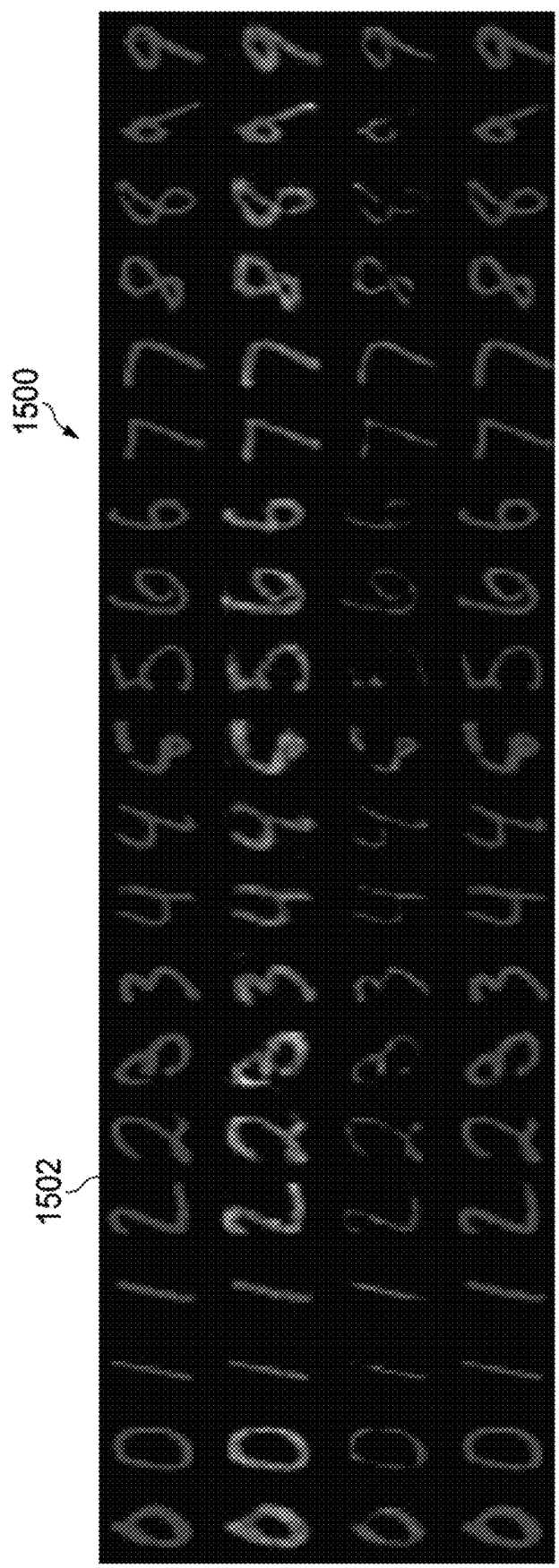
FIG. 15 is an illustration of the reconstructions of digits after training using neurogenic deep learning in accordance with an illustrative embodiment.

With reference to FIG. 15, an illustration of the reconstructions of digits after training using neurogenic deep learning is depicted in accordance with an illustrative embodiment. Image 1500 shows reconstructions 1502. As can be seen in comparison to reconstructions 1402 in image 1400 made before training, reconstructions 1502 in image 1500 show increased clarity in the reconstructions of the digits. Results of experiments on Mixed National Institute of Standards and Technology data in this example show that an established network trained on just digits 1 and 7 can be trained to represent and classify new digits as guided by the reconstruction error at each encode layer of an autoencoder.

Turning now to FIG. 16, an illustration of a table comparing performance and classifying data is depicted in accordance with an illustrative embodiment. In this illustrative example, table 1600 compares a neural network created with neurogenic deep learning to two control networks.

Table 1600 shows the performance and classifying digits in rows 1602. Performance for neurogenic deep learning neural network created with neurogenic deep learning is in column 1604. A control neural network in column 1606 includes a classifier of the same size as the neurogenic deep learning neural network trained first on the subset digits 1 and 7, and then retrained with one new single digit at a time, using intrinsic replay. A control neural network in column 1608 has a classifier of the same size trained on all digits at once.

As depicted, table 1600 shows that while the best performance is achieved with a fixed neural network on all data, which is not always available, the network built upon neurogenic deep learning slightly outperforms transfer learning on a fixed network. Note that the size of the ultimate network is unknown prior to neurogenic deep learning, so there is particular value in using it to determine an effective size. The original size of the 1,7-autoencoder is 784-300-250-200-250-300-784. Its size after neurogenic deep learning is 784-476-300-340-300-476-784.

Figure 17:
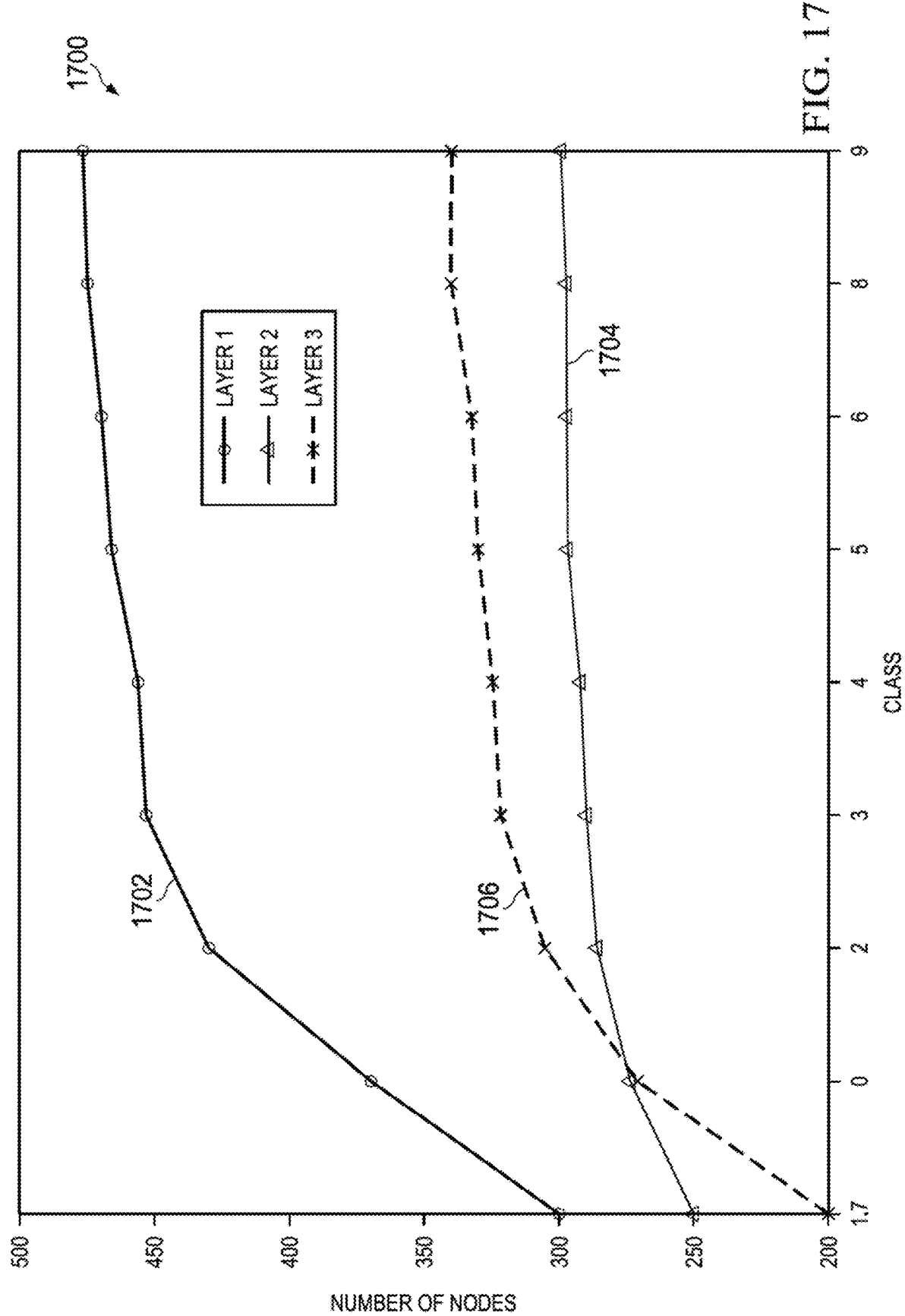
FIG. 17 is an illustration of the growth of layers in a deep neural network in accordance with an illustrative embodiment.

With reference next to FIG. 17, an illustration of the growth of layers in a deep neural network is depicted in accordance with an illustrative embodiment. In this illustrative example, graph 1700 includes lines for three layers. Line 1702 represents layer 1 in the deep neural network; line 1704 represents layer 2 in the deep neural network; and line 1706 represents layer 3 in the deep neural network.

Graph 1700 shows how the deep neural network grows as new classes are presented during neurogenic deep learning. The deep neural network gains more representational capacity as new classes are learned.

In the illustrative example, the control network has the identical size of the neural network trained using neurogenic deep learning, is initially trained on digits 1 and 7 and then learns to represent the remaining Mixed National Institute of Standards and Technology digits, one at a time in the same order as presented during neurogenesis. The control network size is fixed.

Figure 18:
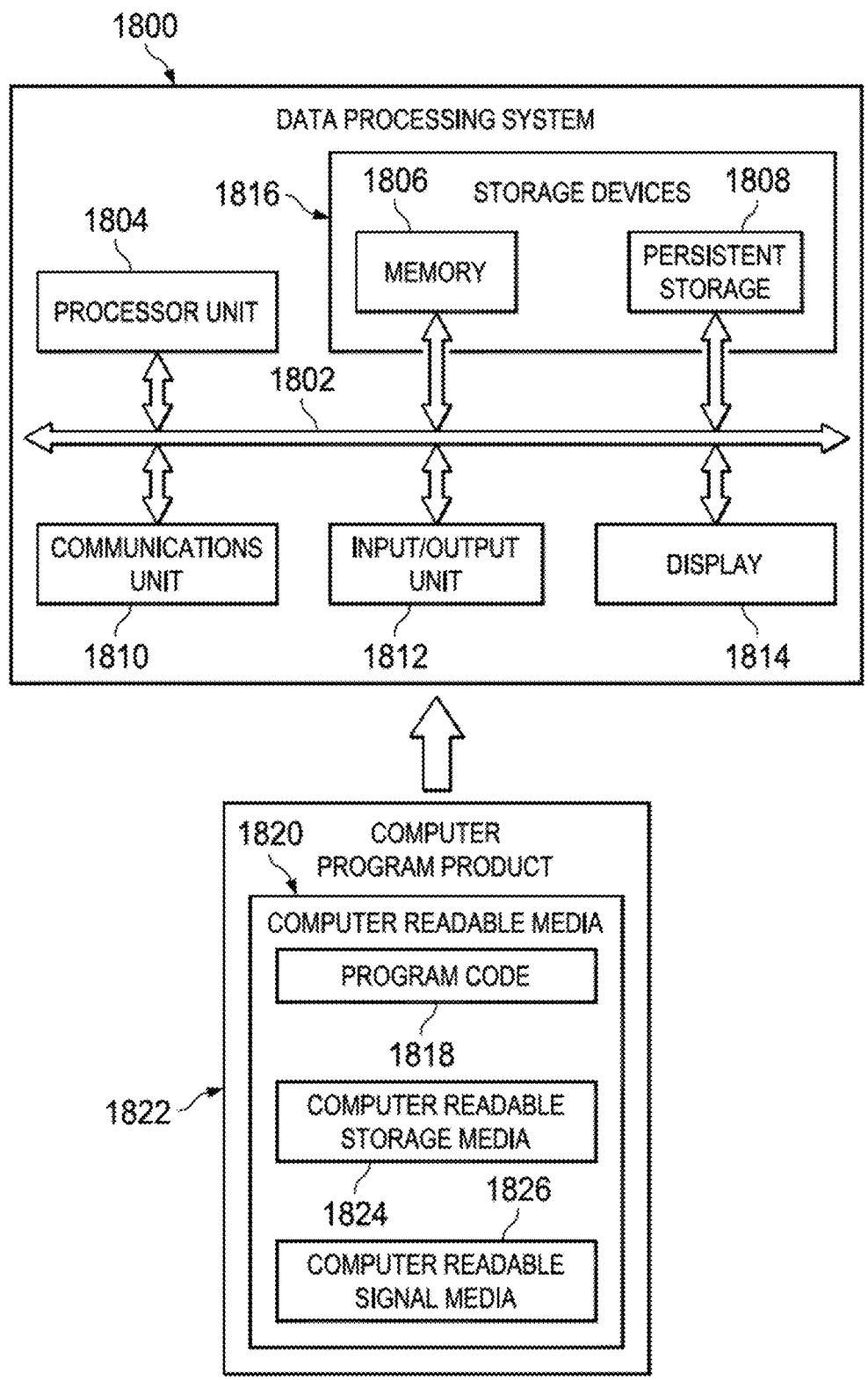
FIG. 18 is an illustration of a block diagram of a data processing system in accordance with an illustrative embodiment.

Turning now to FIG. 18, an illustration of a block diagram of a data processing system is depicted in accordance with an illustrative embodiment. Data processing system 1800 may be used to implement computer system 102 in FIG. 1. In this illustrative example, data processing system 1800 includes communications framework 1802, which provides communications between processor unit 1804, memory 1806, persistent storage 1808, communications unit 1810, input/output (I/O) unit 1812, and display 1814. In this example, communications framework 1802 may take the form of a bus system.

Processor unit 1804 serves to execute instructions for software that may be loaded into memory 1806. Processor unit 1804 may be a number of processors, a multi-processor core, or some other type of processor, depending on the particular implementation.

Memory 1806 and persistent storage 1808 are examples of storage devices 1816. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1816 may also be referred to as computer readable storage devices in these illustrative examples. Memory 1806, in these examples, may be, for example, a random access memory or any other suitable volatile or non-volatile storage device. Persistent storage 1808 may take various forms, depending on the particular implementation.

For example, persistent storage 1808 may contain one or more components or devices. For example, persistent storage 1808 may be a hard drive, a flash memory, a rewritable optical disk, a rewritable magnetic tape, or some combination of the above. The media used by persistent storage 1808 also may be removable. For example, a removable hard drive may be used for persistent storage 1808.

Communications unit 1810, in these illustrative examples, provides for communications with other data processing systems or devices. In these illustrative examples, communications unit 1810 is a network interface card.

Input/output unit 1812 allows for input and output of data with other devices that may be connected to data processing system 1800. For example, input/output unit 1812 may provide a connection for user input through at least one of a keyboard, a mouse, or some other suitable input device. Further, input/output unit 1812 may send output to a printer. Display 1814 provides a mechanism to display information to a user.

Instructions for at least one of the operating system, applications, or programs may be located in storage devices 1816, which are in communication with processor unit 1804 through communications framework 1802. The processes of the different embodiments may be performed by processor unit 1804 using computer-implemented instructions, which may be located in a memory, such as memory 1806.

These instructions are referred to as program code, computer usable program code, or computer readable program code that may be read and executed by a processor in processor unit 1804. The program code in the different embodiments may be embodied on different physical or computer readable storage media, such as memory 1806 or persistent storage 1808.

Program code 1818 is located in a functional form on computer readable media 1820 that is selectively removable and may be loaded onto or transferred to data processing system 1800 for execution by processor unit 1804. Program code 1818 and computer readable media 1820 form computer program product 1822 in these illustrative examples. In one example, computer readable media 1820 may be computer readable storage media 1824 or computer readable signal media 1826. In these illustrative examples, computer readable storage media 1824 is a physical or tangible storage device used to store program code 1818 rather than a medium that propagates or transmits program code 1818.

Alternatively, program code 1818 may be transferred to data processing system 1800 using computer readable signal media 1826. Computer readable signal media 1826 may be, for example, a propagated data signal containing program code 1818. For example, computer readable signal media 1826 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1800 are not meant to provide architectural limitations to the manner in which different embodiments may be implemented. The different illustrative embodiments may be implemented in a data processing system including components in addition to or in place of those illustrated for data processing system 1800. Other components shown in FIG. 18 can be varied from the illustrative examples shown. The different embodiments may be implemented using any hardware device or system capable of running program code 1818.

Thus, the different illustrative examples show a method and apparatus for managing a neural network in a manner that allows for an arbitrary neural network to learn how to process new data that may not be recognizable using the current training. As described, the illustrative examples overcome a technical problem with managing a neural network when changes in data that cannot be processed with a desired level of accuracy by the neural network occur. The process is a neurogenesis process in which an undesired amount of error in encoding data is identified in a layer. A number of new nodes are added to the layer and training is performed such that the new nodes recognized the new data. Additionally, replay data may be used to ensure stability of the other nodes that have been previously trained.

With an illustrative example as described herein, training a new neural network, especially a deep neural network, may be avoided when the current neural network is unable to recognize new data. As a result, less time and expense is needed if the current neural network is unable to recognize new data. Further, this adaptable learning makes it feasible to train neural networks using deep learning even when the data may change over time. The adaptability in learning new data avoids making a neural network obsolete and having to train a new neural network when data changes.

Thus, the technical solution described provides additional technical effects such as the ability to add and train new nodes and avoid over-capacity of a network when training the network. Over-capacity can lead to over-fitting. Further, another technical effect is a neural network may incorporate novel data, potentially differentiated from earlier trained data due to concept drift, into the network's representation.

Additionally, with an illustrative example, online adaptive learning has a minimal reliance on original training data with the ability to create replay data in the illustrative example. The speed of training on new kinds of data may be increased when comparing an ability to perform incremental learning versus full network learning. Further, with the neural network being adaptable to new data, the neural network may be selected, trained with and sized correctly for the current problem at hand. The technical effect is particularly useful for embedded system applications.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for managing a neural network, the method comprising:
    sending data into an input layer in a portion of layers of nodes in the neural network in which the data moves on an encode path through the portion such that an output layer in the portion outputs encoded data;
    sending the encoded data into the output layer on a decode path through the portion back to the input layer to obtain a reconstruction of the data by the input layer;
    determining whether an undesired amount of error has occurred in the output layer based on the data sent into the input layer and the reconstruction of the data;
    adding a number of new nodes to the output layer when a determination is present that the undesired amount of the error has occurred, enabling reducing the error using the number of the new nodes; and
    training the number of new nodes by sending new data on the encode path, wherein training the new nodes does not require replay of old data.

2. The method of claim 1, wherein determining whether the undesired amount of the error has occurred comprises:
    comparing the data to the reconstruction of the data; and
    determining whether a difference between the data and the reconstruction of the data is greater than a threshold for when the undesired amount of the error is present.

3. The method of claim 1 further comprising:
    adding an additional layer from the layers in the neural network to the portion when the undesired amount of the error is absent, wherein the additional layer becomes the output layer, and wherein the additional layer is in a location subsequent to the output layer;
    repeating sending the data into the input layer in the portion of the layers of the nodes in the neural network in which the data moves on the encode path through the portion such that the output layer in the portion outputs encoded data;
    sending the encoded data into the output layer on the decode path through the portion back to the input layer to obtain the reconstruction of the data by the input layer; and
    determining whether the undesired amount of the error has occurred in the output layer based on the data sent into the input layer and the reconstruction of the data.

4. The method of claim 1, wherein the portion of the layers is a single layer and the input layer is the output layer and further comprising:
    selecting another layer in the layers of the nodes as the single layer when the undesired amount of the error is absent;
    sending the data into the single layer on the encode path such that the single layer outputs encoded data;
    sending the encoded data into the single layer on the decode path; and
    determining whether the undesired amount of the error has occurred in the single layer based on the data sent into the input layer and the reconstruction of the data by the single layer.

5. The method of claim 4, wherein:
    the steps of:
        sending the data into the input layer in the portion of the layers of the nodes in the neural network in which the data moves on the encode path through the portion such that the output layer in the portion outputs encoded data;
        sending the encoded data into the output layer on the decode path through the portion back to the input layer to obtain the reconstruction of the data by the input layer;
        determining whether the undesired amount of the error has occurred in the output layer based on the data sent into the input layer and the reconstruction of the data; and
        adding the number of the new nodes in the output layer when the determination is present that the undesired amount of the error has occurred;
    are performed during a normal operation of the neural network.

6. The method of claim 1, wherein training the number of new nodes further comprises:
    creating replay data using statistics about encoding of the data by the neural network; and
    sending the replay data on the encode path in addition to the new data.

7. The method of claim 1, wherein the layers in the neural network comprise:
    encode layers in the layers that encode; and
    a classifier that classifies the data.

8. The method of claim 1, wherein the neural network is a deep learning neural network.

9. The method of claim 1, wherein weights for the new nodes are pretrained in a single-hidden-layer denoising autoencoder and adjust more quickly than weights for the nodes previously present in the network before the new nodes.

10. A computer system comprising:
    a number of processors;
    a number of neural network layers running on the number of processors, the neural network layers comprising:
        an input layer comprising a first number of nodes;
        an output layer comprising a second number of nodes;
    an autoencoder running on the number of processor and configured to:

send data into a portion of the input layer on an encode path through the portion such that an output layer in the portion outputs encoded data;

send the encoded data into the output layer on a decode path through the portion back to the input layer to obtain a reconstruction of the data by the input layer; and a neural network manager running on the number of processor and configured to:

determine whether an undesired amount of error has occurred in the output layer based on the data sent into the input layer and the reconstruction of the data;

add a number of new nodes to the output layer when a determination is present that the undesired amount of the error has occurred, enabling reducing the error using the number of the new nodes; and send new data on the encode path, wherein the new data trains the number of the new nodes, wherein replay of old data is not required to train the new nodes.

11. The computer system of claim 10, wherein in determining whether the undesired amount of the error has occurred, the neural network manager is configured to compare the data to the reconstruction of the data and determines whether a difference between the data and the reconstruction of the data is greater than a threshold for when the undesired amount of the error is present.

12. The computer system of claim 10, wherein the neural network manager is configured to:

add an additional layer from the layers in the neural network to the portion of the layers in a location subsequent to the output layer in the portion when the undesired amount of the error is absent, wherein the additional layer becomes the output layer;

repeat sending the data into the input layer in the portion of the layers of the nodes in the neural network in which the data moves on the encode path through the portion such that the output layer in the portion outputs encoded data;

send the encoded data into the output layer on the decode path through the portion back to the input layer to obtain the reconstruction of the data by the input layer; and determine whether the undesired amount of the error has occurred in the output layer based on the data sent into the input layer and the reconstruction of the data.

13. The computer system of claim 10, wherein the portion of the layers is a single layer and the input layer is the output layer, wherein the neural network manager is configured to:

select another layer in the layers of the nodes as the single layer when the undesired amount of the error is absent;

send the data into the single layer such that the single layer outputs encoded data; sends the encoded data into the single layer on the decode path; and determine whether the undesired amount of the error has occurred in the single layer based on the data sent into the input layer and the reconstruction of the data by the single layer.

14. The computer system of claim 13, wherein the neural network manager is configured to:

send the data into the input layer in the portion of the layers of the nodes in the neural network in which the data moves on the encode path through the portion such that the output layer in the portion outputs the encoded data;

send the encoded data into the output layer on the decode path through the portion back to the input layer to obtain the reconstruction of the data by the input layer;

determine whether the undesired amount of the error has occurred in the output layer based on the data sent into the input layer and the reconstruction of the data; and add the number of the new nodes in the output layer when the determination is present that the undesired amount of the error has occurred during a normal operation of the neural network.

15. The computer system of claim 10, wherein in training the neural network with the number of the new nodes in the layer, the neural network manager is further configured to:

create replay data using statistics about encoding data by the neural network; and send the replay data on the encode path in addition to the new data.

16. The computer system of claim 10, wherein the layers in the neural network comprise encode layers in the layers that encode and a classifier that classifies the data.

17. The computer system of claim 10, wherein the neural network is a deep learning neural network.

18. The computer system of claim 10, wherein weights for the new nodes are pretrained in a single-hidden-layer denoising autoencoder and adjust more quickly than weights for the nodes previously present in the network before the new nodes.

19. A computer program product for managing a neural network, the computer program product comprising:

a computer readable storage media;

first program code, stored on the computer readable storage media, for sending data into an input layer in a portion of layers of nodes in the neural network in which the data moves on an encode path through the portion such that an output layer in the portion outputs encoded data;

second program code, stored on the computer readable storage media, for sending the encoded data into the output layer on a decode path through the portion back to the input layer to obtain a reconstruction of the data by the input layer;

third program code, stored on the computer readable storage media, for determining whether an undesired amount of error has occurred in the output layer based on the data sent into the input layer and the reconstruction of the data;

fourth program code, stored on the computer readable storage media, for adding a number of new nodes to the output layer when a determination is present that the undesired amount of the error has occurred, enabling reducing the error using the number of the new nodes; and fifth program code, stored on the computer readable storage media, for sending new data on the encode path, wherein the new data trains the number of the new nodes, and wherein replay of old data is not required to train the new nodes.

20. The computer program product of claim 19, wherein the third program code comprises:

program code, stored on the computer readable storage media, for comparing the data to the reconstruction of the data; and program code, stored on the computer readable storage media, for determining whether a difference between the data and the reconstruction of the data is greater than a threshold for when the undesired amount of the error is present.

21. The computer program product of claim 19 further comprising:
  sixth program code, stored on the computer readable storage media, for adding an additional layer from the layers in the neural network to the portion of the layers in a location subsequent to the output layer in the portion when the undesired amount of the error is absent, wherein the additional layer becomes the output layer; and
  seventh program code, stored on the computer readable storage media, for repeating running of the first program code, the second program code, and the third program code.

22. The computer program product of claim 19, wherein the portion of the layers is a single layer and the input layer is the output layer and further comprising:
  sixth program code, stored on the computer readable storage media, for selecting another layer in the layers of the nodes as the single layer when the undesired amount of the error is absent;
  seventh program code, stored on the computer readable storage media, for sending the data into the single layer such that the single layer outputs the encoded data;
  eighth program code, stored on the computer readable storage media, for sending the encoded data into the single layer on the decode path; and
  ninth program code, stored on the computer readable storage media, for determining whether the undesired amount of the error occurred in the single layer based on the data sent into the input layer and the reconstruction of the data by the single layer.

23. The computer program product of claim 19 further comprising:
  sixth program code, stored on the computer readable storage media, for creating replay data using statistics about encoding the data by the neural network; and
  seventh program code, stored on the computer readable storage media, for sending the replay data on the encode path in addition to the new data.

24. The computer program product of claim 19, wherein weights for the new nodes are pretrained in a single-hidden-layer denoising autoencoder and adjust more quickly than weights for the nodes previously present in the network before the new nodes.

* * * * *